United States Patent

Aoki et al.

(10) Patent No.: US 10,048,369 B2
(45) Date of Patent: Aug. 14, 2018

(54) RADAR ASSEMBLY

(71) Applicants: DENSO CORPORATION, Kariya, Aichi-pref. (JP); NAGOYA INSTITUTE OF TECHNOLOGY, Nagoya-shi, Aichi (JP)

(72) Inventors: Yutaka Aoki, Kariya (JP); Kazuoki Matsugatani, Kariya (JP); Kunio Sakakibara, Nagoya (JP)

(73) Assignees: DENSO CORPORATION, Kariya, Aichi-pref. (JP); NAGOYA INSTITUTE OF TECHNOLOGY, Nagoya-shi, Aichi (JP)

( * ) Notice: Subject to any disclaimer, the term of this patent is extended or adjusted under 35 U.S.C. 154(b) by 370 days.

(21) Appl. No.: 15/018,660

(22) Filed: Feb. 8, 2016

(65) Prior Publication Data

US 2016/0231417 A1     Aug. 11, 2016

(30) Foreign Application Priority Data

Feb. 9, 2015   (JP) ................. 2015-023436

(51) Int. Cl.
*G01S 13/93*     (2006.01)
*G01S 7/03*      (2006.01)
(Continued)

(52) U.S. Cl.
CPC ............ *G01S 13/931* (2013.01); *G01S 7/032* (2013.01); *G01S 7/038* (2013.01);
(Continued)

(58) Field of Classification Search
CPC ............ G01S 13/931; G01S 2007/027; G01S 2013/9389; G01S 2013/9392; G01S 7/023;
(Continued)

(56) References Cited

U.S. PATENT DOCUMENTS

| 6,323,825 B1* | 11/2001 | Zidek ............. H01Q 1/422 343/753 |
| 2009/0273527 A1* | 11/2009 | Behdad ........... H01Q 1/286 343/705 |
| 2015/0303335 A1* | 10/2015 | Kotter ............ G02B 5/281 250/208.2 |

FOREIGN PATENT DOCUMENTS

| JP | 2005-244884 A | 9/2005 |
| JP | 2006-258449 A | 9/2006 |

(Continued)

OTHER PUBLICATIONS

Broadband matching of high-permittivity coatings with frequency selective surfaces by F. Fitzek et al; Proceedings of the 6th German Microwave Conference; Mar. 14-16, 2011.

*Primary Examiner* — Timothy A Brainard
(74) *Attorney, Agent, or Firm* — Knobbe, Martens, Olson & Bear, LLP

(57) ABSTRACT

In a radar assembly, a first dielectric member includes a dielectric outermost structural member of a vehicle. A radar device includes an antenna module, and a substantially tubular or domed radome. The radome includes a transmissive portion, and is disposed to cover the antenna module such that the transmitted radar wave passes through the transmissive portion. The transmissive portion is disposed behind the back surface of the first dielectric member with space thereto. A second dielectric member includes at least the transmissive portion, and is disposed to face the first dielectric member. A frequency-selective substrate passes a radar wave within a frequency band therethrough, and block radar waves outside the frequency band. The frequency-selective substrate is disposed such that its first surface is directly abutted onto the first dielectric member, and its second surface is directly abutted onto the second dielectric member to constitute a sandwich structure.

16 Claims, 14 Drawing Sheets

(51) Int. Cl.
  *H01Q 15/00*   (2006.01)
  *G01S 7/02*    (2006.01)
  *H01Q 1/32*    (2006.01)

(52) U.S. Cl.
  CPC .......... *H01Q 15/0013* (2013.01); *G01S 7/023* (2013.01); *G01S 2007/027* (2013.01); *G01S 2013/9389* (2013.01); *G01S 2013/9392* (2013.01); *H01Q 1/3233* (2013.01)

(58) Field of Classification Search
  CPC ..... G01S 7/032; G01S 7/038; H01Q 15/0013; H01Q 1/3233
  USPC ........................................................ 342/175
  See application file for complete search history.

(56) References Cited

FOREIGN PATENT DOCUMENTS

| | | |
|---|---|---|
| JP | 2007-017289 A | 1/2007 |
| JP | 2009-170887 A | 7/2009 |
| JP | 2012-249490 A | 12/2012 |

\* cited by examiner

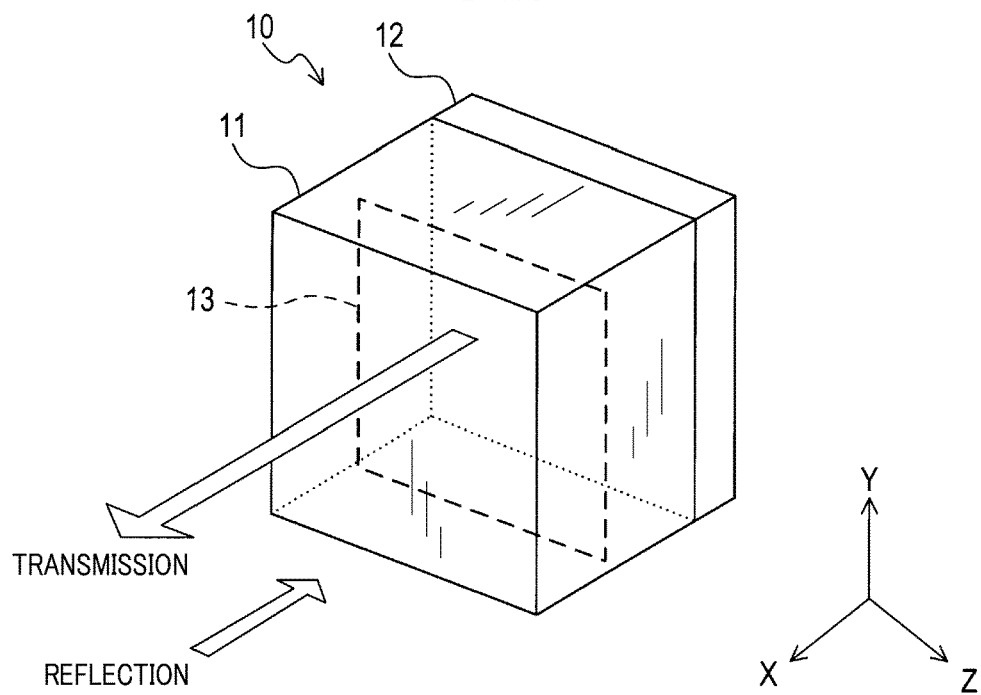
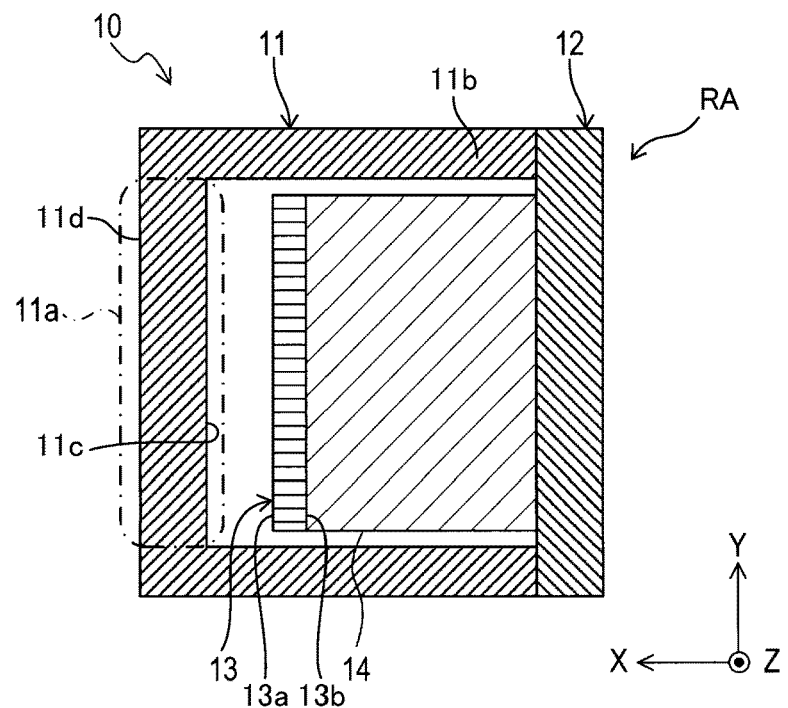

RADAR ASSEMBLY

CROSS REFERENCE TO RELATED APPLICATIONS

This application is based on and claims the benefit of priority from Japanese Patent Application 2015-023436 filed on Feb. 9, 2015, the disclosure of which is incorporated in its entirety herein by reference.

TECHNICAL FIELD

The present disclosure relates to radar assemblies each including a radar device, a frequency-selective substrate, and an outermost structural member of a vehicle.

BACKGROUND

Radar devices are each mounted mainly to the front portion of a vehicle between a radiator grille and a radiator for monitoring, for example, the forward view of the vehicle. A grill cover is commonly mounted on a grill. Such a grill cover is commonly made of a specific material that has low reflectivity to radio waves, i.e. radar waves, transmitted from a radar device.

Radar devices have been recently needed for monitoring a closer region thereto with a wider field of view. In order to meet these requirements, a radar device is expected to be mounted to the inner side of a bumper cover, the inner side of a front windshield, or the inner side of a resin body of a vehicle.

Unfortunately, these bumper covers, front windshields, and resin bodies commonly have low radar wave transmittance. A bumper cover or a resin body made of materials with high transmittance of radar waves might reduce the aesthetics of the vehicle. A front windshield has difficulty in having high transmittance of radar waves while maintaining its high shatterproof characteristics.

A bumper cover, a front windshield, or a resin body, to which a radar device is mounted, with low transmittance of radar waves may reduce the energy of radar waves that have reached targets, resulting in deterioration of the target-detection capability of the radar device.

A bumper cover or a front windshield, to which a radar device is mounted, with low transmittance of radar waves may also cause radar waves reflected by the bumper cover or the front windshield to be received by a receiving antenna of the radar device. This may reduce the detection reliability of the radar device in detecting targets. In addition, the electrical power of radar waves reflected by a bumper cover or a front windshield is likely be higher than the electrical power of echoes generated based on reflection of transmitted radar waves by a target in front of the vehicle. This may make it difficult for a receiving circuit of the radar device to detect the echoes.

If a radome covers a transmitting antenna of a radar device, the radome may reflect radar waves transmitted from the transmitting antenna.

Accordingly, users have high expectations for the structure of mounting a radar device to a vehicle, which enables efficient reduction of reflection of transmitted radar waves by at least one of vehicle's members, such as a bumper cover, and a radome of the radar device. In particular, it is preferable that the structure of mounting a radar device to a vehicle enables efficient reduction of reflection of transmitted radar waves by at least one of the vehicle's members, such as a bumper cover. This is because the amount of reflection from vehicle's members including a bumper cover is relatively larger than the amount of reflection from the radome.

On the other hand, a non-patent document, "*Broadband matching of high-permittivity coatings with frequency selective surfaces*", written by Frerk Fitzek, Ralph H. Rasshofer, Erwin M. Biebl, Proceedings of the 6$^{th}$ German Microwave Conference, Mar. 14-16, 2011, discloses the following technology. Specifically, the technology discloses a dielectric plate-like bumper cover with one major side, on which a frequency-selective surface (FSS) substrate is formed, to reduce reflection of radar waves by the bumper cover. The following refers to the disclosed bumper cover as an FSS bumper cover.

SUMMARY

The non-patent document discloses the calculated results of the reflection of the FSS bumper cover. The calculated results show sufficiently reduced reflection of the FSS bumper cover.

Unfortunately, the FSS bumper cover, from which the calculated results disclosed in the non-patent document are obtained, has a thickness of, for example, 254 µm, which is substantially the tenth part of the thickness of a usual plate-like bumper cover. The FSS bumper cover with a very thin thickness is not realistic when the FSS bumper cover is used for vehicles.

In view of these circumstances, the inventors of the present application calculated the reflection of an FSS bumper cover with the thickness of 3 mm as an example of usual values of the bumper-cover's thickness; the FSS substrate is comprised of square cells each including a square-looped slot therein (see FIG. 4A described later).

The calculated results show that reflection of the FSS bumper cover is little reduced. That is, the calculated results show that the FSS bumper cover with usual thickness, such as 3 mm, may be not necessarily effective in reducing reflection of radar waves from the FSS bumper cover.

In view of the circumstances set forth above, an exemplary aspect of the present disclosure seeks to provide radar assemblies, each of which includes a radar device, a frequency-selective substrate, and an outermost structural member of a vehicle, and is capable of efficiently reducing reflection of radar waves from the outermost structural member.

According to an exemplary aspect of the present disclosure, there is provided a radar assembly of a vehicle. The radar assembly includes a first dielectric member having a back surface and including a dielectric outermost structural member of the vehicle, and a radar device. The radar device includes an antenna module configured to transmit a radar wave within a predetermined frequency band and to receive an echo based on the transmitted radar wave. The radar device includes a substantially tubular or domed radome comprising a transmissive portion and disposed to cover at least the antenna module such that the transmitted radar wave passes through the transmissive portion so as to be emitted outwardly from the radar device. The transmissive portion is disposed behind the back surface of the first dielectric member with space between the transmissive portion and the back surface of the first dielectric member. The radar assembly includes a second dielectric member comprised of at least the transmissive portion and disposed to face the first dielectric member; and a frequency-selective substrate. The frequency-selective substrate has opposing first and second surfaces, and is configured to pass the radar wave within the predetermined frequency band therethrough, and block radar waves outside the predetermined frequency band. The frequency-selective substrate is disposed such that the first surface is directly abutted onto the first dielectric member and the second surface is directly abutted onto the second dielectric member to constitute a sandwich structure based on the first dielectric member, the frequency-selective substrate, and the second dielectric member.

The radar assembly according to the exemplary aspect is configured such that the radar wave transmitted from the radar device passes through the sandwich structure so as to be emitted outwardly from the outermost structural member of the vehicle. This enables reflection of the radar wave from at least the outermost structural member to be efficiently reduced, thus improving the transmissivity of the transmitted radar wave through the outermost structural member of the vehicle to the outside of the vehicle.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more features of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 2A is a perspective view schematically illustrating an example of the structure of the radar device illustrated in FIG. 1;

FIG. 2B is a vertical cross sectional view of the radar device illustrated in FIG. 2A;

DETAILED DESCRIPTION OF EMBODIMENT

Figure 1:
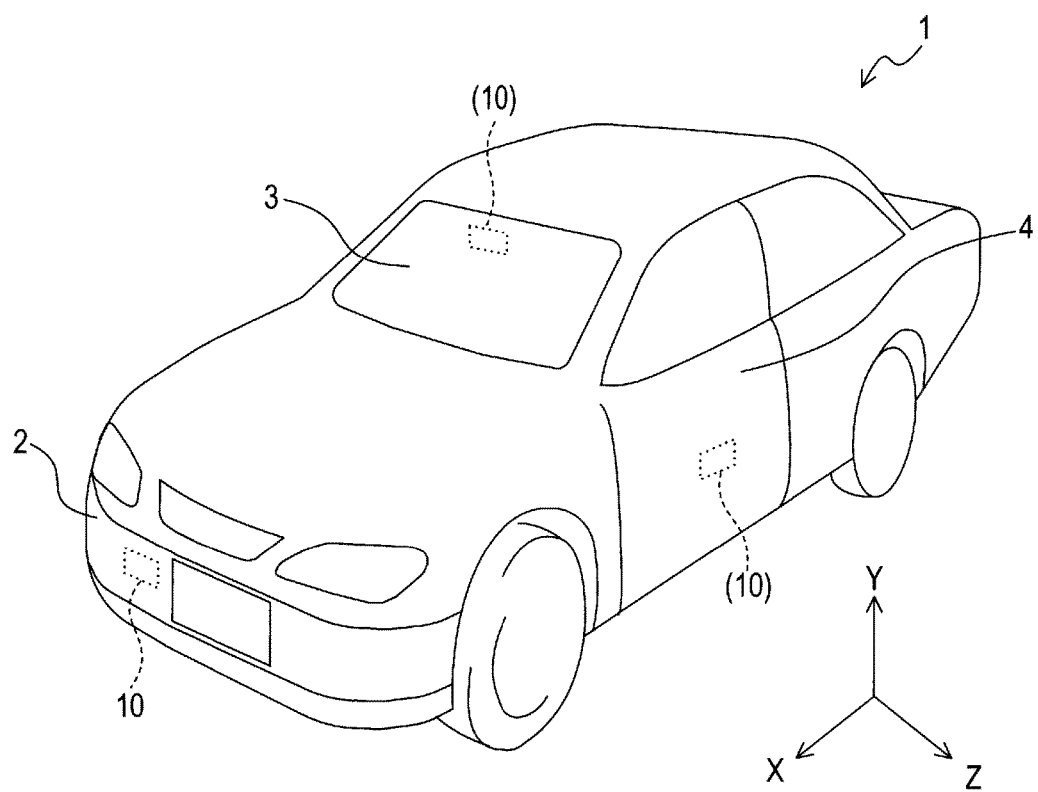
FIG. 1 is a perspective view of a vehicle in which a radar device is installed according to each of the first to fourth embodiments of the present disclosure.

The following describes embodiments of the present disclosure with reference to the accompanying drawings. In the drawings, identical reference characters are utilized to identify identical corresponding components.

First Embodiment

Referring to FIG. 1, a radar device 10 according to a first embodiment of the present disclosure is mounted behind a front bumper cover 2 of a vehicle 1.

The bumper cover 2 has plate-like shape according to the first embodiment. Note that the first embodiment describes the radar device 10 mounted behind the bumper cover 2 as an example, but where the radar device 10 is mounted to the vehicle 1 can be freely determined depending on the intended use thereof. The radar device 10 disposed behind the front bumper cover 2 is to detect targets in front of the vehicle 1. For example, the radar device 10 can also be mounted behind a front windshield, i.e. a front glass panel, 3 of the vehicle 1 in the vehicle cabin for detecting targets in front of the vehicle 1 (see FIG. 1). The radar device 10 can further be mounted behind a door panel, i.e. a left door panel, 4 of the vehicle 1, for detecting targets located at a lateral side, i.e. the left side, of the vehicle 1.

The bumper cover 2, the front windshield 3, and the door panel 4 are each an outermost structural member of the vehicle 1; the outer surface of each of the outermost structural members is exposed on the outside of the vehicle 1. In other words, each of the bumper cover 2, the front windshield 3, and the door panel 4 constitute a part of the outermost portion of the vehicle 1. The following describes the example in which the radar device 10 is mounted behind the door panel 4 as the second embodiment of the present disclosure. The following also describes the example in which the radar device 10 is mounted behind the front windshield 3 as each of the third and fourth embodiments of the present disclosure.

Each of the bumper cover 2 and the door panel 4 is made of a resin material, in other words, is comprised of a dielectric material having a predetermined permittivity. The front windshield 3 is also made of a dielectric material having a predetermined permittivity.

Note that the following describes the longitudinal direction, i.e. forward and rearward direction, of the vehicle 1 as an X-axis direction, and describes the vertical direction of the vehicle 1, i.e. the direction perpendicular to the road surface on which the vehicle 1 is located, as a Y-axis direction. The following also describes a horizontal direction, i.e. a width direction, of the vehicle 1 as a Z-axis direction. The following also describes the forward orientation in the longitudinal direction as the X-axial forward direction. The following also describes the opposite orientation of the forward orientation in the longitudinal direction, i.e. the rearward orientation in the longitudinal direction, as the X-axial rearward direction.

The radar device 10, which is mounted behind the bumper cover 2, is configured to transmit radar waves within a predetermined frequency band, and receives echoes generated based on reflection of the radar waves from at least one target located mainly in front of the vehicle. Then, the radar device 10 recognizes, based on the received echoes, the at least one target. The radar device 10 according to the first embodiment uses radar waves within the frequency band ranging from, for example, 24.05 to 24.25 GHz inclusive.

Referring to FIG. 2, the radar device 10 includes a radome 11 and a housing 12 paring with each other, and the whole of the radar device 10 has a substantially rectangular parallelepiped shape.

The radome 11 has a substantially rectangular base wall 11a and a substantially rectangular tubular sidewall 11b having a first peripheral edge surrounding the base wall 11a.

The housing 12 has a substantially rectangular plate-like shape, and has opposing first and second major surfaces 12a and 12b. The tubular sidewall 11b has a second peripheral edge mounted on the peripheral portion of the first major surface 12a of the housing 12 to form a housing chamber in the radome 11 and housing 12.

At least the base wall 11a of the radome 11 is configured as a transmissive portion 11a through which radar waves transmitted from the radar device 10 and echoes to be received by the radar device 10 is able to pass.

At least the transmissive portion 11a is made of a resin material. Specifically, the transmissive portion 11a is comprised of a dielectric material having a predetermined permittivity. Note that radar waves are transmittable through the transmissive portion 11a. Some radar waves incident to the transmissive portion 11a are affected by the transmissive portion 11a. For example, some radar waves input to the transmissive portion 11a are attenuated by the transmissive portion 11a and/or reflected by the outer surface of the transmissive portion 11a. If at least part of the radome 11 is made of a dielectric material, some of the radar waves are also affected by the at least part of the radome 11.

The radar device 10 also includes an antenna module 13 and a radar module 14 housed in the housing chamber formed by the housing 12 and the radome 11.

The antenna module 13 includes an antenna substrate with opposing first and second major surfaces 13a and 13b, a transmitting antenna unit, and a receiving antenna unit. The transmitting antenna unit and the receiving antenna unit are formed on the first major surface 13a of the antenna substrate. The first major surface 13a therefore also refers to as an antenna-formed surface 13a. The antenna module 13 is disposed in the housing chamber such that the antenna-formed surface 13a of the antenna substrate faces an inner surface 11c of the transmissive portion 11a. The radome 11 also has an outer surface 11d including an outer surface, which is opposite to the inner surface 11c, of the transmissive portion 11a.

The radar module 14 has a substantially rectangular-parallelepiped case having an opening first major surface and a second major surface opposite to the first major side. The case of the radar module 14 is mounted at its first major surface on the second major surface 13b of the antenna substrate, and mounted at its second major surface on the first major surface 12a of the housing 12. The case of the radar module 14 has a peripheral edge surrounding the opening, and the antenna substrate is mounted on the peripheral edge of the case of the radar module 14. The radar module 14 includes a radar transceiver electrically connected to the transmitting antenna and the receiving antenna.

The radar device 10 is installed in the vehicle 1 such that the center axis of radar waves transmitted from the radar module 14 of the radar device 10 is along the X-axis, i.e. the longitudinal direction of the vehicle 1, and the transmitted radar waves are input to the transmissive portion 11a of the radome 11.

The radar transceiver transmits radar waves from the transmitting antenna unit at controlled timings, and receives, via the receiving antenna unit, echoes based on reflection of the transmitted radar waves from various objects, including one or more targets, in front of the vehicle 1. Then, the radar transceiver performs predetermined signal processing based on the received echoes, thus recognizing, for example, pieces of the positional information about the one or more targets. Then, the radar transceiver sends the recognized results to an unillustrated control unit installed in the vehicle 1.

In particular, the radar transceiver is designed as a frequency-modulated continuous wave (FM-CW) radar transceiver that transmits, as a transmission signal, continuous radar waves via the transmitting antenna unit; the continuous radar waves are frequency modulated to have a frequency that increases in an up section over time and decreases in a down section over time. The FM-CW radar transceiver receives, as received signals, arrival echoes (arrival waves)

via the receiving antenna unit; the echoes include echoes generated by reflection of the continuous radar wave from a target. The radar transceiver generates, based on the received echoes, positional information associated with the target that has reflected the continuous radar wave. Of course, a selected one of the other various radar transceivers can be used as the radar transceiver according to the first embodiment.

That is, the above radar device 10 is configured such that the radome 11 and the housing 12 cover entirely the antenna module 13 and the radar module 14, in other words, the antenna module 13 and the radar module 14 are housed in the housing chamber, i.e. the inner space, defined by the radome 11 and the housing 12. Note that the radome 11 and the housing 12 can cover the antenna module 13 and the radar module 14 while a part of at least one of the antenna module 13 and the radar module 14 is exposed.

The radar waves transmitted from the antenna module 13 under control of the radar module 14 pass though the transmissive portion 11a of the radome 11 so as to be radiated in front of the vehicle 1. Arrival echoes based on reflection of the transmitted radar waves from something are input through the transmissive portion 11a into the housing chamber of the radome 11 and the housing 12 so as to be received by the antenna module 13.

Next, the following describes how the radar device 10 is mounted to the vehicle 1.

Figure 3A:
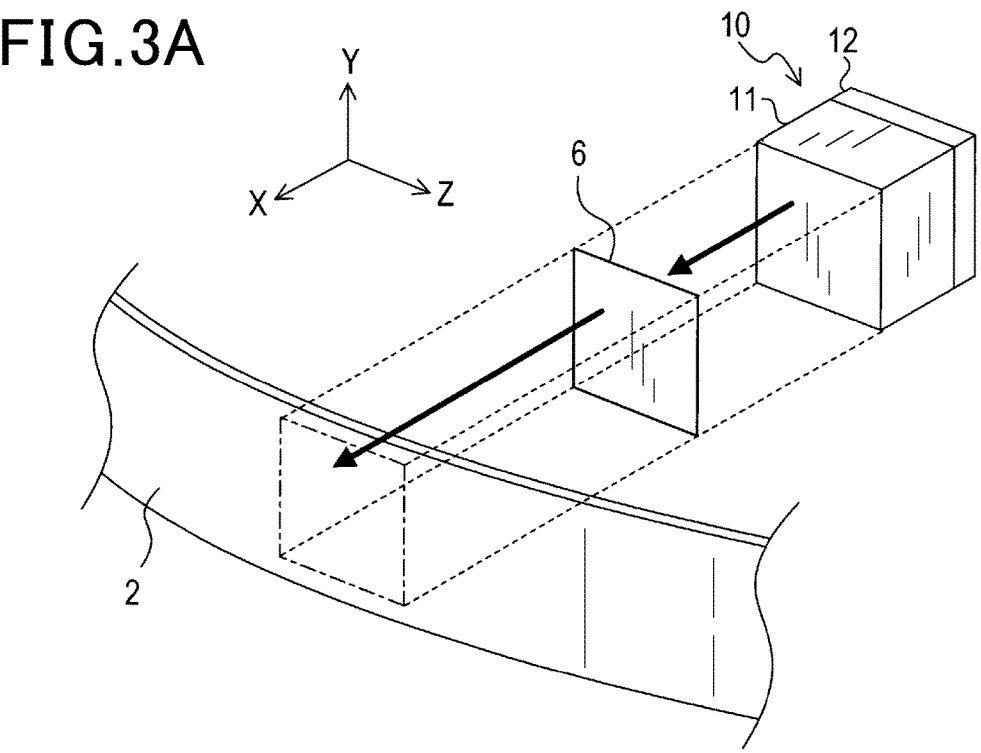
FIG. 3A is an exploded perspective view schematically illustrating how the radar device and a frequency-selective substrate are mounted to a bumper cover of the vehicle according to the first embodiment.

A plate-like substrate 6, which has opposing first major surface 6a and second major surface 6b, is prepared as a mount configured to mount the radar device 10 of the first embodiment to the bumper cover 2 of the vehicle 1. The substrate 6 serves as a frequency-selective surface (FSS) member 6. The substrate 6 will be referred to as a frequency-selective substrate 6. Specifically, referring to FIGS. 3A and 3B, the frequency-selective substrate 6 is closely mounted at its first major surface 6a on the back surface 2a of the bumper cover 2. The radar device 10 is mounted to the frequency-selective substrate 6 such that the outer surface 11d of the radome 11 is closely mounted on the second major surface 6b of the frequency-selective substrate 6 while the center of the outer surface 11d aligns with the center of the second major surface 6b. In other words, the outer surface 11d of the radome 11 is closely mounted to the back surface 2a of the bumper cover 2 via the frequency-selective substrate 6 while the center of the outer surface 11d aligns with the center of the second major surface 6b.

The frequency-selective substrate 6 serves as, for example, a bandpass filter, which is operative to pass radar waves within a specified frequency band therethrough, and blocks radar waves outside the specified frequency band. The frequency-selective substrate 6 of the first embodiment is configured to have the frequency band ranging from 24.05 to 24.25 GHz inclusive as its specified frequency band. In other words, the frequency-selective substrate 6 is configured to exhibit a resonance in the specified frequency band, thus passing radio waves within the specified frequency band.

As described above, the frequency-selective substrate 6 is closely attached at its first major surface 6a to the back surface 2a of the bumper cover 2, and the radar device 10 is closely attached on the second major surface 6b of the frequency-selective substrate 6.

In other words, the whole of the first major surface 6a of the frequency-selective substrate 6 in the X-axial forward direction is physically, i.e. directly, adhered to the rear surface 2a of the bumper cover 2. The whole of the second major surface 6b of the frequency-selective substrate 6 in the X-axial rearward direction is physically, i.e. directly, adhered to the outer surface 11d of the radome 11.

That is, the frequency-selective substrate 6 is sandwiched between the bumper cover 2, i.e. a first dielectric member, and the transmissive portion 11a, i.e. a second dielectric member, of the radar device 10.

Note that the first embodiment can use various specific methods for mounting the radar device 10 to the frequency-selective substrate 6 so as to mount the radar device 10 to the bumper cover 2. For example, the radar device 10 can be fixed onto the bumper cover 2 with stays. As another example, the radar device 10 can be mounted to a front portion of a chassis of the vehicle 1 such that the outer surface 11d of the radome 11 is mounted onto the second major surface 6b of the frequency-selective substrate 6. This results in the radar device 10 being indirectly mounted to the bumper cover 2. Each of the second and fourth embodiments described later shows an example of how the radar device 10 is mounted to the chassis of the vehicle 1.

Radar waves transmitted from the antenna module 13 of the radar apparatus 10 pass through the transmissive portion 11a, the frequency-selective substrate 6, and the bumper cover 2 so as to be emitted outwardly from the vehicle 1. Arriving echoes based on reflection of the transmitted waves from something pass through the bumper cover 2, the frequency-selective substrate 6, and the transmissive portion 11a of the radome 11 so as to be received by the antenna module 13.

Figure 3B:
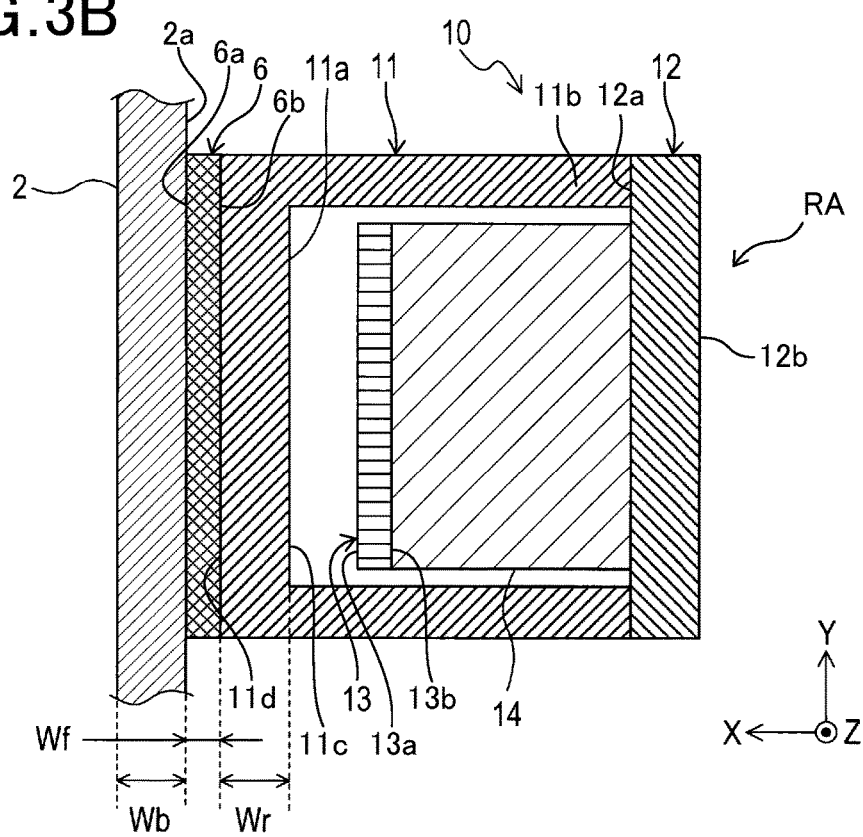
FIG. 3B is a vertical cross sectional view schematically illustrating the radar device is mounted to the bumper cover such that the radar device and the bumper cover sandwich the frequency-selective substrate according to the first embodiment.

FIG. 3B schematically illustrates that the bumper cover 2, which is an outermost structural member of the vehicle 1, has a thickness Wb in the X-axis direction, the transmissive portion 11a of the radome 11 has a thickness Wr in the X-axial direction, and the frequency-selective substrate 6 has a thickness Wf in the X-axis direction. These thicknesses Wb, Wr, and Wf can be freely determined. For example, the first embodiment sets the thicknesses Wb and Wr to 2.8 mm, and the thickness Wf to 35 μm.

The bumper cover 2 has a permittivity $\varepsilon b$, and the transmissive portion 11a of the radome 11 has a permittivity $\varepsilon re$ that is identical to the permittivity $\varepsilon b$ of the bumper cover 2. For example, the first embodiment sets each of the permittivity $\varepsilon b$ and the permittivity $\varepsilon re$ to 2.47. The bumper cover 2 has a dissipation factor, i.e. a loss tangent, tan $\delta b$, and the transmissive portion 11a of the radome 11 also has a dissipation factor, i.e. a loss tangent, tan $\delta re$ that is identical to the dissipation factor tan $\delta b$ of the bumper cover 2. For example, the first embodiment sets each of the dissipation factors $\delta b$ and tan $\delta re$ to 0.0009.

The permittivity $\varepsilon b$ and the permittivity $\varepsilon re$ can be freely set to other values, and the dissipation factors tan $\delta b$ and tan $\delta re$ can also be freely set to other values.

Figure 4A:
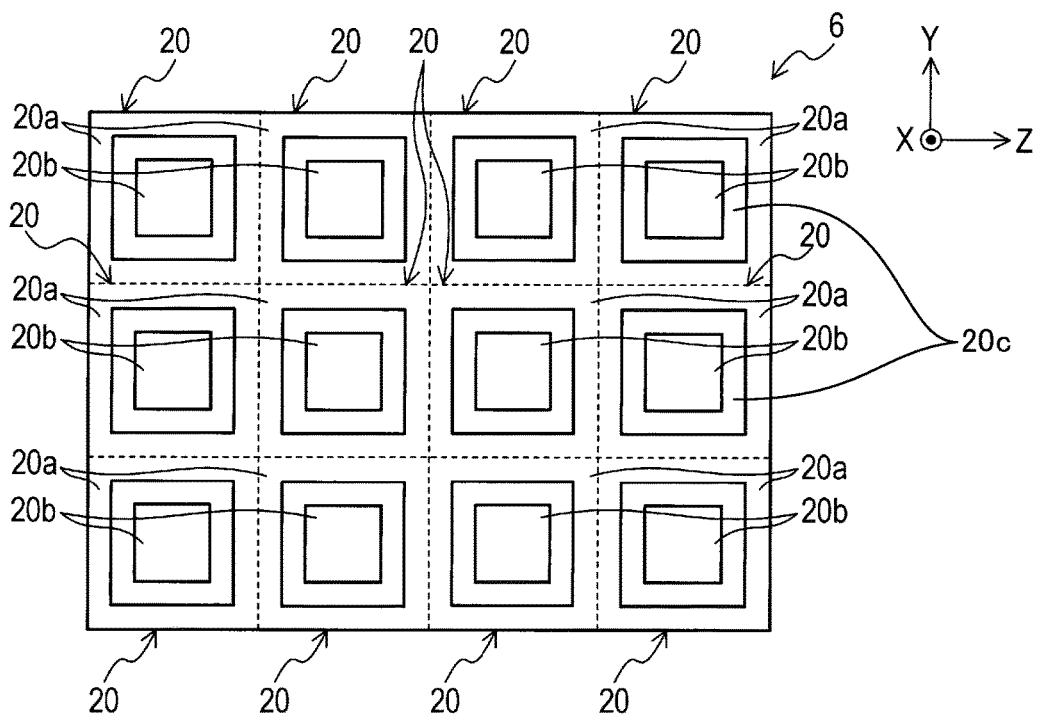
FIG. 4A is a major side view of the frequency-selective substrate illustrated in FIG. 3B.

Referring to FIG. 4A, the frequency-selective substrate 6 is comprised of a plurality of frequency-selective elements, i.e. cells, 20, which has, for example, a square shape, arranged monolithically in a two-dimensional matrix in the Y- and Z-axis directions. In other words, the frequency-selective elements 20 are not physically separated from each other. Each of the frequency-selective elements 20 has the above function of passing radar waves within the specified frequency band therethrough, and rejecting radar waves outside the specified frequency band. For this reason, the number of the frequency-selective elements 20 constituting the frequency-selective substrate 6 can be freely determined. The first embodiment determines the number of the frequency-selective elements 20 enough to cover the whole of the outer surface 11d of the transmissive portion 11a.

Figure 4B:
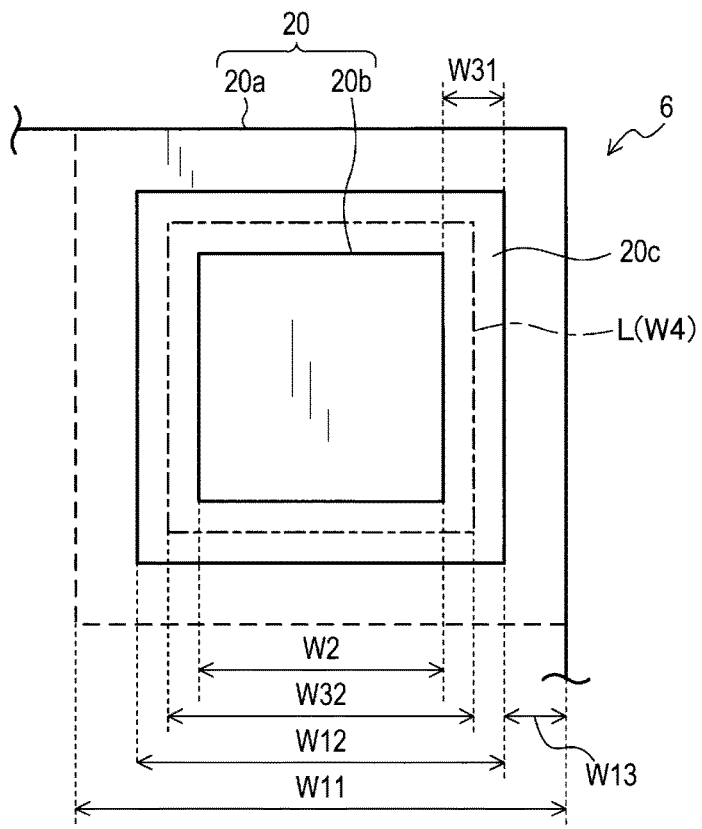
FIG. 4B is a major side view of a frequency-selective element of the frequency-selective substrate illustrated in FIG. 4A.

Referring to FIG. 4B, each frequency-selective element 20, which has, for example, a substantially square shape, has a square-looped frequency-selective conductor pattern for generating a resonance with radar waves within the specified frequency band. Specifically, each frequency-selective element 20 includes a square-looped outer conductor 20a with an inner space, i.e. an inners slot, 20c and a square inner conductor 20b concentrically disposed in the inner slot 20c of the outer conductor 20a. In other words, the inner conductor 20b is arranged in the inner slot of the outer conductor 20a such that the center of the inner conductor 20b matches with the center of the outer conductor 20a, i.e. the center of the whole area of the outer conductor 20a.

Each frequency-selective element 20 includes a square-looped slot 20c between the square-looped outer conductor 20a and the square inner conductor 20b, so that each frequency-selective element 20 is also called as a square-loop slotted conductor or a square-loop slotted frequency-selective element. That is, each frequency-selective element 20 has a square-looped frequency-selective conductor pattern.

Referring to FIG. 4B, reference character W11 shows the length of each side of the frequency-selective substrate 30, i.e. the length of each outer side of the outer conductor 20a; the following refers to the length W11 as an outer-conductor outside width. Reference character W12 shows the length of each outer side of the inner slot 20c, i.e. the length of each inner side of the outer conductor 20a; the following refers to the length W12 as an outer-conductor inside width. Reference character W13 shows the width of the outer conductor 20a, i.e. the length of the outer conductor 20a in the Z-axis direction; the following refers to the width W13 as an outer-conductor width.

Reference character W2 shows the length of each side of the inner conductor 20b; the following refers to the length W2 as an inner-conductor width. Reference character W31 represents the width of the inner slot 20c, i.e. the length of the inner slot 20c in the Z-axis direction; the following refers to the length W31 as an inner-slot width.

Reference character W32 represents the length, i.e. width, of each side of a square center loop L of the inner slot 20c; the following refers to this as a loop width. That is, the square center loop L of the inner slot 20c passes through the center of the width of the inner slot 20c in the Z-axis direction and the center of the width of the inner slot 20c in the Y-axis direction around the inner conductor 20b. Reference character W4 represents the length of the square center loop L of the inner slot 20c; the following refers to this as a loop length.

These dimensions, i.e. parameters, W11, W12, W13, W2, W31, W32, and W4 of each frequency-selective element 20 are freely determined within the intended use of the frequency-selective substrate 6. The intended use of the frequency-selective substrate 6 is to reduce in-vehicle reflection of radar waves transmitted from the antenna module 13 towards the antenna module 13 instead of being emitted outwardly. In other words, the adjusted parameters W11, W12, W13, W2, W31, W32, and W4 of each frequency-selective element 20 enable the corresponding frequency-selective element 20 to take place a resonance of radar waves within the specified frequency band, thus passing the radar waves therethrough.

The assembly of the bumper cover 2, the frequency-selective substrate 6, and the radome 11 of the radar device 10, which serves as a radar assembly RA according to the first embodiment, includes the sandwich structure, i.e. the three-layered structure, configured such that the first dielectric member, i.e. the bumper cover 2, and the second dielectric member, i.e. the transmissive portion 11a, sandwich the frequency-selective substrate 6 from both the major sides 6a and 6b.

For this reason, the dimensions W11, W12, W13, W2, W31, W32, and W4 of each frequency-selective element 20 depend on the physical characteristics of the first and second dielectric members, such as their values of permittivity and their dissipation factors. Each of the permittivity $\varepsilon b$ of the bumper cover 2 and the permittivity $\varepsilon re$ of the transmissive portion 11a is set to 2.47, and each of the dissipation factor tan $\delta b$ of the bumper cover 2 and the dissipation factor tan $\delta re$ of the transmissive portion 11a is set to 0.0009 in the first embodiment set forth above. Based on the physical characteristics of the bumper cover 2 and the transmissive portion 11a, the dimensions W11, W12, W13, W2, W31, W32, and W4 of each frequency-selective element 20 are set as follows:

Specifically, the outer-conductor outside width W11 is set to 3.4 mm, the outer-conductor inside width W12 is set to 3.2 mm, and the outer-conductor width W13 is set to 0.1 mm. The inner-conductor width W2 is set to 2.3 mm, the inner-slot width W31 is set to 0.45 mm, the loop width W32 is set to 2.75 mm, and the loop length W4 is set to 11 mm. The values of the dimensions W11, W12, W13, W2, W31, W32, and W4 show an example in various values of the W11, W12, W13, W2, W31, W32, and W4.

The following schematically describes how the sandwich structure of the frequency-sensitive substrate 6 and the first and second dielectric members sandwiching the frequency-sensitive substrate 6 reduces reflection of radar waves in the vehicle 1.

Reflection of radar waves are mainly generated at the interface, i.e. the boundary surface, between two mediums is due to the difference in refractive index between the two mediums. The difference in refractive index between the two mediums also causes phase shift of radar waves when the radar waves are transmitted from one of the two mediums to the other thereof.

For example, let us assume that the bumper cover 2 is singly located in free space, and transmits radar waves to the back surface 2a of the bumper cover 2. In this assumption, there are mainly two reflection routes through which the transmitted radar waves are reflected from something. The first route is a route through which some of the transmitted radar waves reach the back surface 2a of the bumper cover 2 so as to be reflected by the surface of the bumper cover 2. The second route is a route through which some of the transmitted radar waves pass through the back surface 2a of the bumper cover 2, and are reflected by the front surface of the bumper cover 2, which is opposite to the back surface 2a thereof, so as to be retuned through the back surface 2a. Phase shift takes place once during the radar-wave reflection of the back surface 2a in the first route. In contrast, phase shift takes place when the radar-wave passes through the back surface 2a during the radar-wave reflection at the front surface, and when the returned radar-wave passes through or is reflected off the back surface 2a, i.e. three times in the second route.

It might be difficult to efficiently reduce reflected radar waves generated in both the first and second routes if the bumper cover 2 were solely provided without the usage of the frequency-selective substrate 6. In particular, it could be difficult to efficiently reduce reflected radar waves generated in both the first and second routes, which are based on transmitted radar waves with the frequency at 24 GHz or thereabout, if the bumper cover 2 having the thickness Wb of 2.8 mm were solely provided without the usage of the frequency-selective substrate 6.

Let us consider a comparative example where the frequency-selective substrate 6 is mounted on the back surface 2a of the bumper cover 2. The comparative example may reduce the reflectivity of transmitted radar waves from the assembly of the frequency-selective substrate 6 and the bumper cover 2 depending on the thickness of the bumper cover 2 and the frequency band of the transmitted radar waves. This is mainly because the arrangement of the frequency-selective substrate 6 enables adjustment of the refractive index of the interface between the bumper cover 2 and the frequency-selective substrate 6.

Unfortunately, only the arrangement of the frequency-selective substrate 6 on the back surface 2a of the bumper cover 2, in other words, only the arrangement of a dielectric member, i.e. the bumper cover 2, on the first major surface 6a of the frequency-selective substrate 6, may be insufficient to reduce the reflectivity of transmitted radar waves from the assembly of the frequency-selective substrate 6 and the bumper cover 2. In particular, even if the frequency-selective substrate 6 is arranged on the back surface 2a of the bumper cover 2 having the thickness Wb of 2.8 mm, it may be difficult to reduce the reflectivity of transmitted radar waves with the frequency of 24.5 GHz or thereabout from the assembly of the frequency-selective substrate 6 and the bumper cover 2.

Figure 5A:
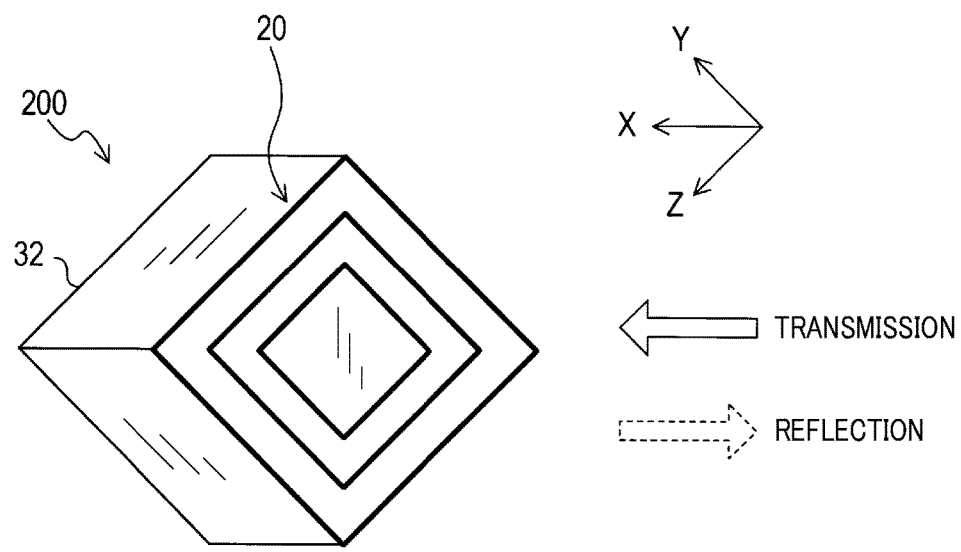
FIG. 5A is a perspective view schematically illustrating a simulation model according to a comparison example in which a square-loop slotted frequency-selective element is disposed at its one major surface on a resin substrate.

FIG. 5A illustrates a simulation model 200 according to a comparison example in which the square-loop slotted frequency-selective element 20 is disposed at its one major surface on a resin substrate 32 having a thickness identical to the thickness Wb (2.8 mm) of the bumper cover 2. In other words, the simulation model 200 is configured such that the dielectric member 32 is located on one major surface of the frequency-selective element 20. Then, a simulation was performed by transmitting radar waves with the frequency range from 0 Hz to 50 GHz to the other major surface of the frequency-selective element 20. During the simulation, the frequency characteristics of the reflectivity of the transmitted radar waves from the simulation model 200 were measured.

Figure 5B:
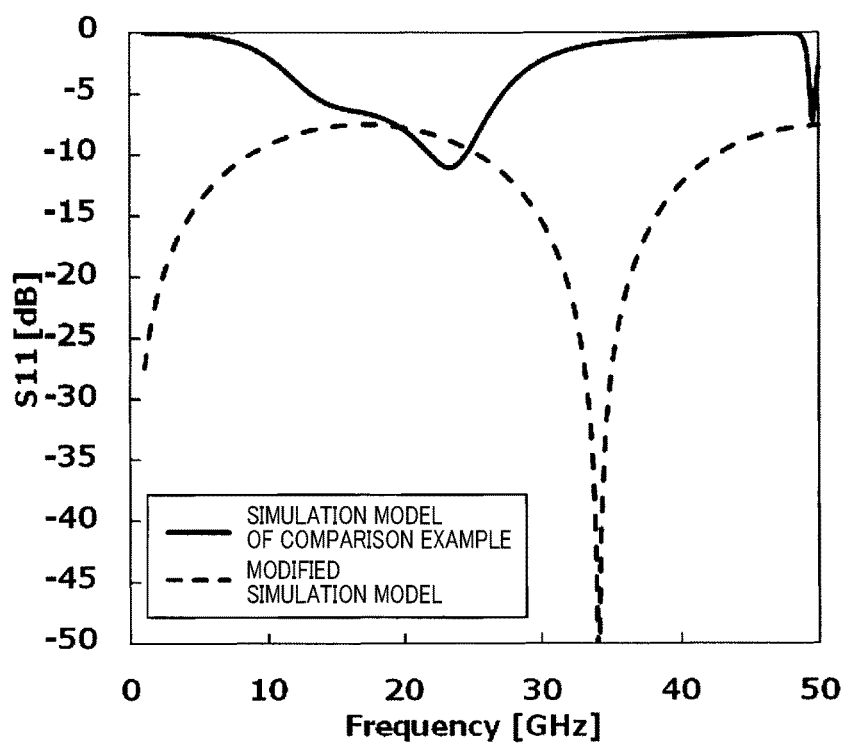
FIG. 5B is a graph schematically illustrating measured results of frequency characteristics of the reflectivity of transmitted radar waves from the simulation model illustrated in FIG. 5A.

FIG. 5B schematically illustrates, by the solid line, the measured results of the frequency characteristics of the reflectivity (S11 in FIG. 5B) of the transmitted radar waves from the simulation model 200. FIG. 5B shows little reduction of the reflectivity of the transmitted radar waves from the simulation model 200 at the frequency of 24 GHz or thereabout. FIG. 5B also illustrates, by the dashed line, the measured results of the frequency characteristics of the reflectivity (S11 in FIG. 5B) of the transmitted radar waves from a modified simulation model 200a, from which no frequency-selective element 20 is mounted on the resin substrate 32, as a reference. FIG. 5B also shows little reduction of the reflectivity of the transmitted radar waves from the simulation model 200, from which the frequency-selective element 20 has been removed, at the frequency of 24 GHz or thereabout.

In contrast, the radar assembly RA of the bumper cover 2, the frequency-selective substrate 6, and the radome 11 of the radar device 10 according to the first embodiment includes the sandwich structure configured such that the first dielectric member, i.e. the bumper cover 2, and the transmissive portion 11a, i.e. the second dielectric member, sandwich the frequency-selective substrate 6 from both the first and second major surfaces 6a and 6b. The radar assembly RA of the bumper cover 2, the frequency-selective substrate 6, and the radome 11 of the radar device 10 enables the reflectivity of transmitted radar waves within the frequency band ranging from 24.05 to 24.25 GHz from the radar assembly RA to be efficiently reduced.

Figure 6A:
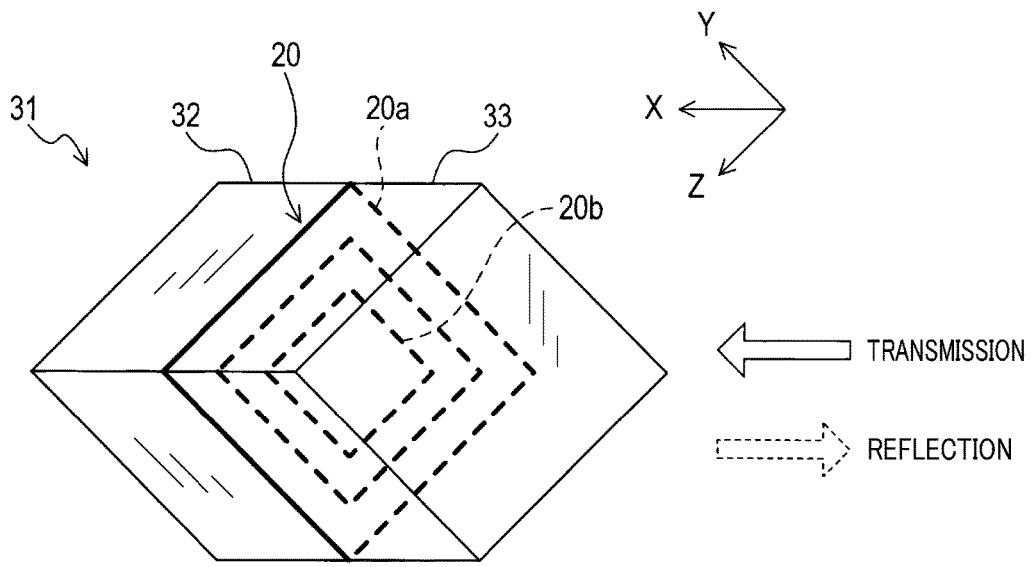
FIG. 6A is a perspective view schematically illustrating a reduced simulation model of a radar assembly of the bumper cover, the frequency-selective substrate, and a radome of the radar device according to the first embodiment.
Figure 6B:
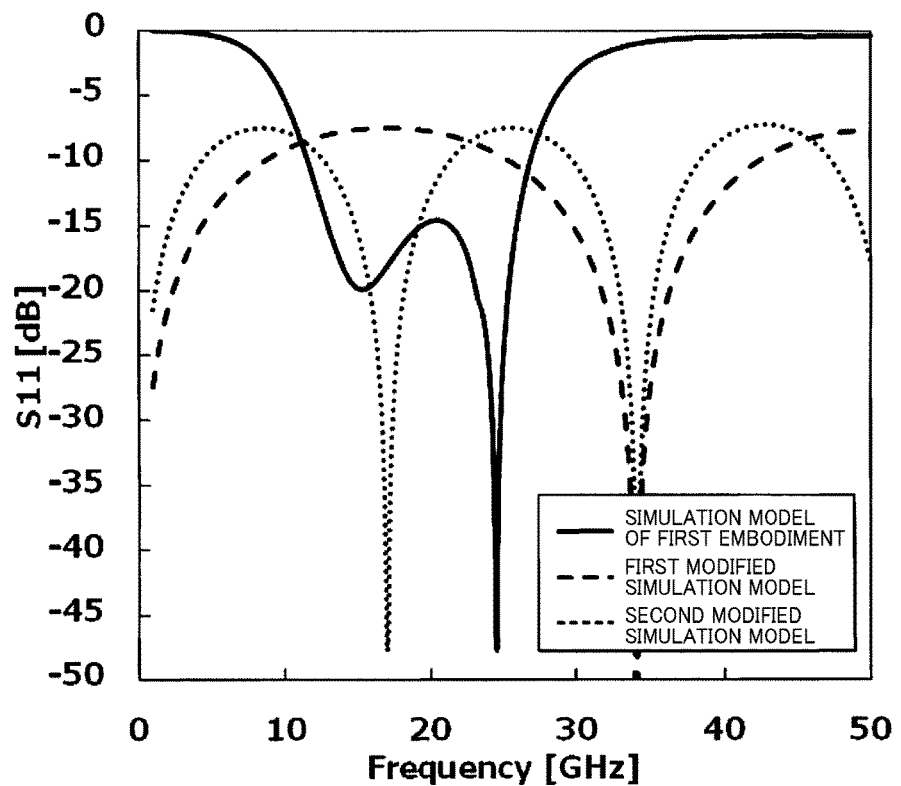
FIG. 6B is a graph schematically illustrating measured results of frequency characteristics of the reflectivity of transmitted radar waves from the simulation model illustrated in FIG. 6A.

The following describes the reflectivity reduction effects achieved by the radar assembly RA of the bumper cover 2, the frequency-selective substrate 6, and the radome 11 of the radar device 10 including the sandwich structure according to the first embodiment with reference to FIGS. 6A and 6B.

FIG. 6A illustrates a simulation model 31. The simulation model 32 is configured such that the resin substrate 32, i.e. the first resin substrate 32, having a thickness identical to the thickness Wb (2.8 mm) of the bumper cover 2 and a second resin substrate 33 having a thickness identical to the thickness Wr of the transmissive portion 11a of the radome 11 sandwich the frequency-selective element 20 from both major surfaces thereof. That is, the simulation model 31 is a reduced model of the radar assembly RA of the bumper cover 2, the frequency-selective substrate 6, and the radome 11 of the radar device 10 according to the first embodiment.

Then, a simulation was performed by transmitting radar waves with the frequency range from 0 to 50 GHz to the resin substrate 33 of the simulation model 31. During the simulation, the frequency characteristics of the reflectivity of the transmitted radar waves from the simulation model 31 was measured.

FIG. 6B schematically illustrates, by the solid line, the measured results of the frequency characteristics of the reflectivity (S11 in FIG. 6B) of the transmitted radar waves from the simulation model 31. FIG. 6B also illustrates, by the dashed line, the measured results of the frequency characteristics of the reflectivity (S11 in FIG. 5B) of the transmitted radar waves from a first modified simulation model 31a, from which the frequency-selective element 20 and second resin substrate 33 have been eliminated, as a reference. That is, the first modified simulation model 31a consists of only the resin substrate 32. FIG. 6B further illustrates, by the dotted line, the measured results of the frequency characteristics of the reflectivity (S11 in FIG. 6B) of the transmitted radar waves from a second modified simulation model 31b configured such that the second resin substrate 33 is directly mounted on the first resin substrate 32 without the frequency-selective element 20 as a reference.

FIG. 6B shows little reduction of the reflectivity of the transmitted radar waves from each of the first and second modified simulation model 31a and 31b at the frequency of 24 GHz or thereabout.

In contrast, FIG. 6B shows sufficient reduction of the reflectivity of the transmitted radar waves from the simulation model 31 within at least the frequency range from 24.05 to 24.25 GHz. In particular, FIG. 6B shows a predetermined target reduction level of the reflectivity of the transmitted radar waves, which is set to, for example, −20 dB, from the simulation model 31 within the frequency range from 24.05 to 24.25 GHz.

Figure 7A:
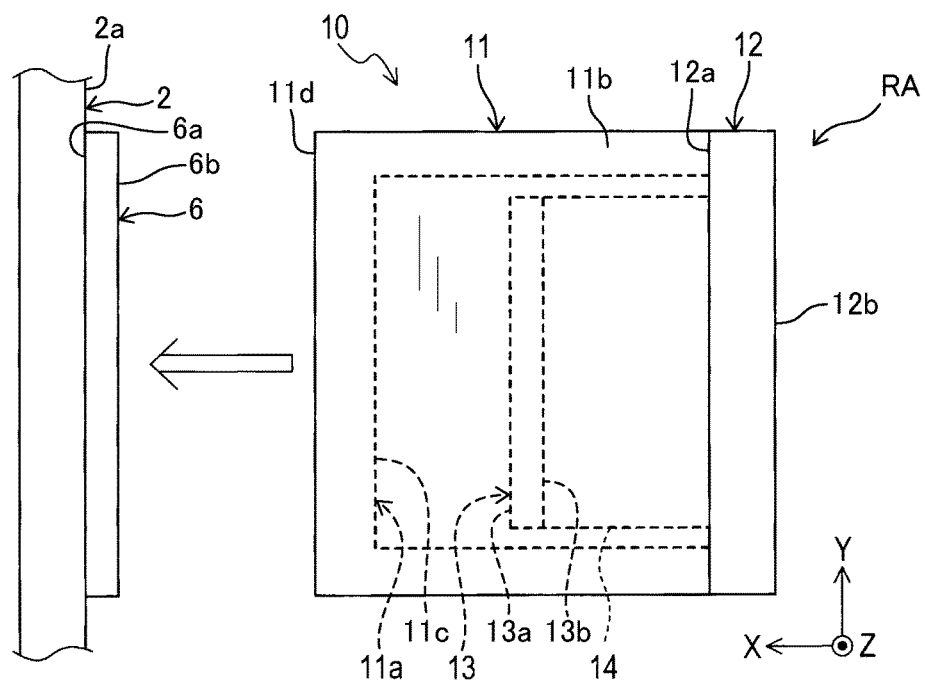
FIG. 7A is an exploded side view schematically illustrating a typical example of the procedure to mount the radar device to the bumper cover of the vehicle according to the first embodiment.
Figure 7B:
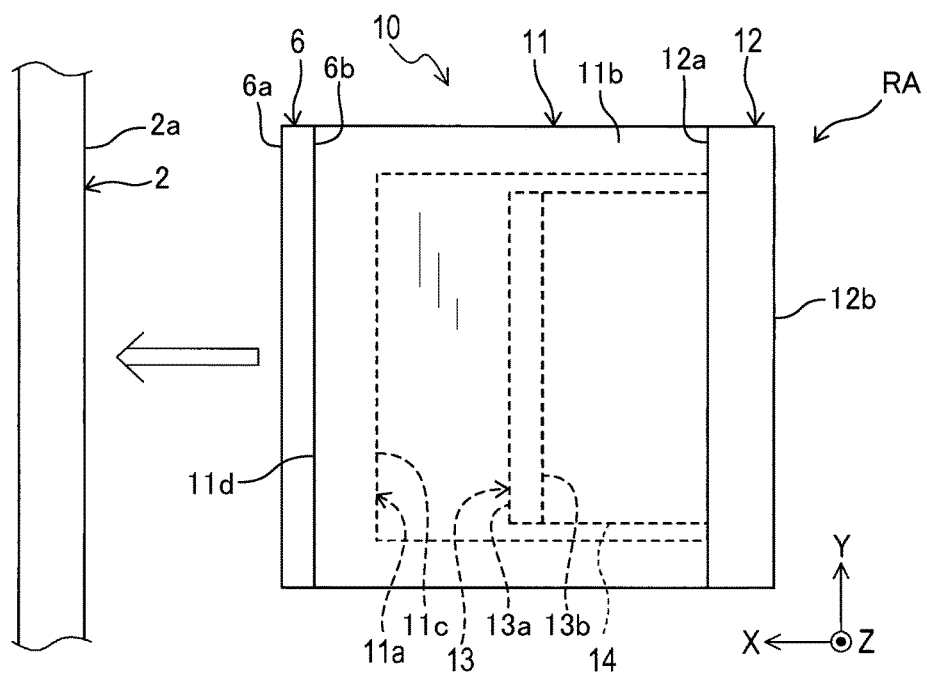
FIG. 7B is an exploded side view schematically illustrating another typical example of the procedure to mount the radar device to the bumper cover of the vehicle according to the first embodiment.

Next, the following describes examples of the procedure to mount the radar device 10 to the bumper cover 2 of the vehicle 1 according to the first embodiment with reference to FIGS. 7A and 7B. That is, various examples of the procedure to mount the radar device 10 to the bumper cover of the vehicle 1 are available, and FIGS. 7A and 7B illustrate typical examples of the mounting procedure.

Specifically, as illustrated in FIG. 7A, the first typical example of the mounting procedure arranges the frequency-selective substrate 6 at its first major surface 6a on the back surface 2a of the bumper cover 2 first. Then, the first typical example of the mounting procedure presses the radome 11 of the radar device 10 to the frequency-selective substrate 6 so that the radome 11 is arranged at its enter outer surface 11d on the second major surface 6b of the frequency-selective substrate 6 next. While the radome 11 of the radar device 10 is arranged at its entire outer surface 11d on the second major surface 6b of the frequency-selective substrate 6, the first typical example of the mounting procedure fastens the assembly of the frequency-selective cover 6 and the radar device 10 to the bumper cover 2 using one of various fastening methods. This results in completion of mounting of the radar device 10 to the back surface 2a of the bumper cover 2. For example, as described above, the radar device 10 can be fastened to the bumper cover 2 with stays.

One of various mounting methods can be used to mount the frequency-selective substrate 6 on the back surface 2a of the bumper cover 2. For example, a metal substrate is prepared; the metal substrate has opposing major surfaces, the area of each of which is identical to the area of each of the first and second major surfaces 6a and 6b of the frequency-selective substrate 6. Then, the metal substrate is mounted on a predetermined region of the back surface 2a of the bumper cover 2; the predetermined region is selected from the entire back surface 2a for mounting of the frequency-selective substrate 6. Then, etching is applied to the metal substrate to consequently produce the frequency-selective substrate 6 comprised of the plurality of frequency-selective elements 20 each having the square-looped frequency-selective conductor pattern illustrated in FIGS. 4A and 4B.

In addition, as illustrated in FIG. 7B, the second typical example of the mounting procedure mounts the frequency-selective substrate 6 to the outer surface 11d of the transmissive portion 11a of the radome 11 of the radar device 10 so that the second major surface 6b of the frequency-selective substrate 6 covers the entire outer surface 11d of the transmissive portion 11a of the radome 11 first.

Then, the second typical example of the mounting procedure presses the assembly of the radar device 10 and the frequency-selective substrate 6 to the back surface 2a of the bumper cover 2 so that the entire first major surface 6a of the frequency-selective substrate 6 is abutted onto the back surface 2a of the bumper cover 2. While the assembly of the frequency-selective substrate 6 and the radar device 10 is mounted to the back surface 2a of the bumper cover 2, the second typical example of the mounting procedure fastens the assembly of the frequency-selective cover 6 and the radar device 10 to the bumper cover 2 using one of various fastening methods. This results in completion of mounting of the radar device 10 to the back surface 2a of the bumper cover 2. For example, like the first typical example of the mounting procedure, the radar device 10 can be fastened to the bumper cover 2 with stays.

The above radar assembly RA according to the first embodiment includes the assembly of the bumper cover 2, the frequency-selective substrate 6, and the transmissive portion 11a of the radome 11 of the radar device 10 includes the sandwich structure, i.e. the three-layer structure. The sandwich structure is configured such that the first dielectric member, i.e. the bumper cover 2, and the transmissive portion 11a, i.e. the second dielectric member, sandwich the frequency-selective substrate 6 from both the major sides 6a and 6b.

The sandwich structure of the radar assembly RA according to the first embodiment enables reflection of radar waves, which are transmitted from the radar device 10, from the bumper cover 2 of the vehicle 1 to be efficiently reduced. The sandwich structure of the radar assembly RA according to the first embodiment also enables reflection of the transmitted radar waves from the transmissive portion 11a of the radome 11 to be efficiently reduced. This improves the transmissivity of the transmitted radar waves through the bumper cover 2 of the vehicle 1 to the outside of the vehicle 1 more than the transmissivity of transmitted radar waves through the bumper cover of the comparative example.

The thickness Wb of the bumper cover 2 according to the first embodiment is set to a thickness, for example, 2.8 mm, of a bumper cover commonly usable for vehicles, and therefore, the thickness Wb of the bumper cover 2 is larger than the thickness of the bumper cover disclosed in the non-patent document set forth above. Even if the frequency-selective substrate 6 is disposed behind the bumper cover 2 with such a large thickness, the aforementioned sandwich structure of the radar assembly RA according to the first embodiment enables reduction of reflection of transmitted radar waves from both the bumper cover 2 and radome 11.

This therefore enables the radar module 14 to detect, with a higher accuracy, arrival echoes based on reflection the transmitted radar waves from something, including a target, located in front of the vehicle 1.

Second Embodiment

Figure 8:
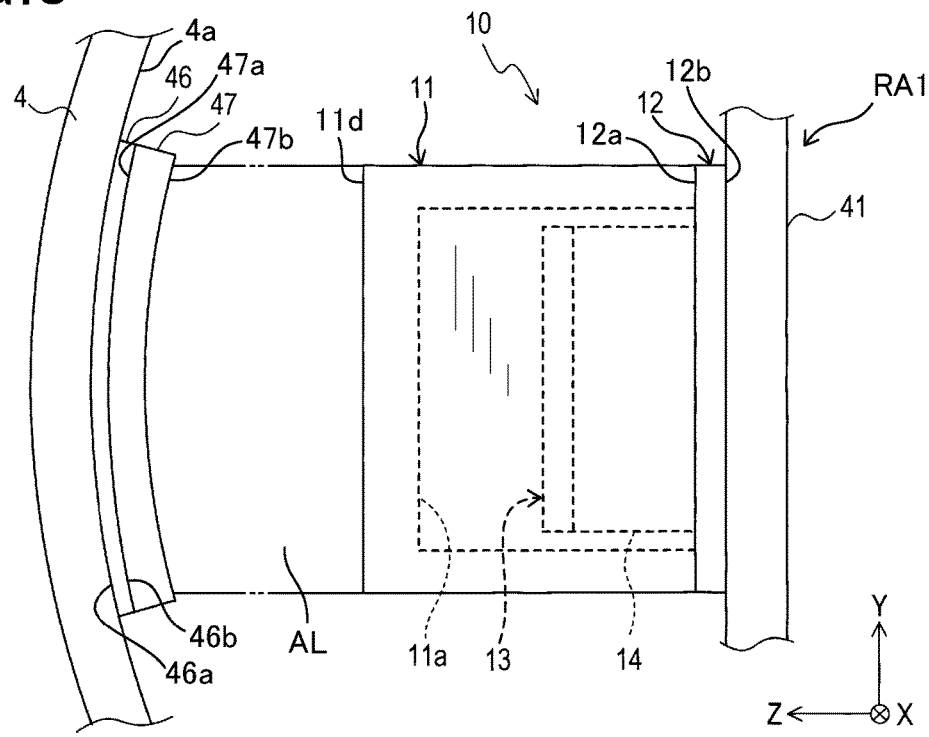
FIG. 8 is a side view of a radar assembly according to the second embodiment.

The following describes a radar assembly RA1 according to the second embodiment of the present disclosure with reference to FIG. 8.

The structure and functions of the radar assembly RA1 according to the second embodiment are mainly different from those of the radar assembly RA according to the first embodiment by the following first to fifth different points.

The first different point is that a frequency-selective substrate 46, which has opposing first major surface 46a and second major surface 46b, is closely mounted at its first major surface 46a on the back surface 4a of the door panel 4. The frequency-selective substrate 46 is comprised of the plurality of frequency-selective elements 20 like the frequency-selective substrate 6.

The second different point is that a plate-like seal member 47, which has opposing first and second major surfaces 47a and 47b, is closely mounted at its first major side 47a on the second major surface 46b of the frequency-selective substrate 46.

The third different point is that the radar device 10 is arranged behind the door panel 4 such that the center axis of radar waves transmitted from the radar module 14 of the radar device 10 is along the Z-axis, i.e. the left direction of the vehicle 1.

The fourth different point is that the housing 12 of the radar device 10 is mounted to a body frame 41 of the vehicle 1; the body frame 41 constitutes the chassis of the vehicle 1. For example, the housing 12 of the radar device 10 is fixedly mounted at its second major side 12b on the body frame 41 of the vehicle 1.

The fifth different point is that the outer surface 11d of the transmissive portion 11a of the radome 11 faces the second major side 47b of the seal member 47 with space, i.e. air layer, AL between the second major side 47b and the outer surface 11d of the transmissive portion 11a while the center of the outer surface 11d aligns with the center of the second major surface 47b. In other words, the outer surface 11d of the radome 11 is located at a predetermined distance from the second major side 47b of the seal member 47 while the center of the outer surface 11d aligns with the center of the second major surface 47b.

As described above, the door panel 4 is made of a resin material, in other words, is comprised of a dielectric material having a predetermined permittivity.

For example, the door panel 4 is made of the same resin material as the resin material of the bumper cover 2. The door panel 4 has a substantially plate-like shape with a predetermined thickness, and also has predetermined curvature so as to have an outwardly convex shape in the X-axis direction, i.e. the longitudinal direction, of the vehicle 1. Because the door panel 4 has the predetermined curvature so as to have the outwardly convex shape in the longitudinal direction of the vehicle 1, each of the frequency-selective substrate 46 and the seal member 47 has a predetermined curvature, which is identical to the curvature of the door panel 4, so as to have an outwardly convex shape in the longitudinal direction of the vehicle 1.

That is, the radar apparatus 10 is fixedly mounted at its housing 12 to the body frame 41 of the vehicle 1 while the outer surface 11d of the transmissive portion 11a of the radome 11 faces the second major side 47b of the seal member 47 with the space between the second major side 47b and the outer surface 11d of the transmissive portion 11a. For this reason, the shortest distance between the center of the outer surface 11d of the transmissive portion 11a of the radome 11 and the back surface 4a of the door panel 4 is longer than the shortest distance between the center of the outer surface 11d of the transmissive portion 11a of the radome 11 and the back surface 2a of the bumper cover 2.

The frequency-selective substrate 46 according to the second embodiment is arranged such that the first major surface 46a is physically abutted onto the back surface 4a of the door panel 4. The seal member 47, which is made of an adhesive resin material, in other words, an adhesive dielectric material with a predetermined permittivity, is physically adhered at its first major surface 47a to the second major surface 46b of the frequency-selective substrate 46.

For example, the relationship between the permittivity of the door panel 4 and the permittivity of the seal member 47 can be set to be substantially identical to the relationship between the permittivity of the bumper cover 2 and the permittivity of the transmissive portion 11a of the radome 11. The thickness in the direction of the normal to the curvature of each of the door panel 4, frequency-selective substrate 46, and the seal member 47 is referred to as a normal-directional thickness of a corresponding one of the door panel 4, frequency-selective plate 46, and the seal member 47. At that time, the relationship between the normal-directional thicknesses of the door panel 4, frequency-selective substrate 46, and the seal member 47 can be set to be, for example, similar to the relationship between the thicknesses of the bumper cover 2, the frequency-selective substrate 6, and the transmissive portion 11a of the radome 11.

The radar assembly RA1 according to the second embodiment is configured such that the radar apparatus 10 is fixedly mounted to the body frame 41 of the vehicle 10. This results in space between the outer surface 11d of the transmissive portion 11a of the radome 11 and the back surface 4a of the door panel 4. This makes it difficult to bring the outer surface 11d of the radome 11 into directly contact with the second major surface 46b of the frequency-selective substrate 46 whose first major surface 46a is mounted on the back surface 4a of the door panel 4. In order to reduce reflection of transmitted radar waves from the door panel 4 to improve the transmissivity of the transmitted radar waves through the door panel 4, it is necessary to provide a sandwich structure where first and second dielectric members sandwich the frequency-selective substrate 46 from both the first and second major surfaces 6a and 6b like the first embodiment.

Accordingly, the assembly of the door panel 4, the frequency-selective substrate 46, and the seal member 47 includes a sandwich structure, i.e. a three-layered structure. The sandwich structure is configured such that a first dielectric member, i.e. the door panel 4, and a second dielectric member, which is comprised of the seal member 47, the air layer AL, and the transmissive portion 11a sandwich the frequency-selective substrate 46 from both the major sides 46a and 46b. The air layer AL serves as a dielectric member with the predetermined permittivity.

The radar device 10 is arranged such that the outer surface 11d of the transmissive portion 11a faces the second major surface 47b of the seal member 47 with the space, i.e. the air layer AL, between the outer surface 11d and the second major surface 47b.

The sandwich structure of the radar assembly RA1 according to the second embodiment enables reflection of radar waves, which are transmitted from the radar device 10, from the door panel 4 of the vehicle 1 to be efficiently reduced. The sandwich structure of the radar assembly RA1 according to the second embodiment also enables reflection of the transmitted radar waves from the seal member 47 to be efficiently reduced. This improves the transmissivity of the transmitted radar waves through the door panel 4 of the vehicle 1 to the outside of the vehicle 1 like the first embodiment.

Note that the frequency-selective substrate 46 and the seal member 47 can be independently prepared. The conductor pattern of the frequency-selective substrate 46 can also be formed on the first major surface 47a of the seal member 47 using, for example, etching like the first embodiment, and thereafter, the frequency-selective substrate 46 can be adhered at its first major surface 46a to the back surface 4a of the door panel 4.

A rectangular-plate like frequency-selective substrate can be pressed onto the back surface 4a of the door panel 4 with the predetermined curvature so as to be curved with the same curvature as the curvature of the door panel 4. Then, the frequency-selective substrate 46 with the predetermined curvature can be mounted to the back surface 4a of the door panel 4, thus completing the assembly of the door panel 4 and the frequency-selective substrate 4. A rectangular-plate like frequency-selective substrate can be prepared, and curved with the same curvature as the curvature of the back surface 4, so that the frequency-selective substrate 46 having the same curvature as the curvature of the door panel 4 can be generated. Then, the frequency-selective substrate 46 with the same curvature as the curvature of the door panel 4 can be adhered at its first major surface 46a to the back surface 4a of the door panel 46, thus completing the assembly of the door panel 4 and the frequency-selective substrate 4.

Third Embodiment

Figure 9:
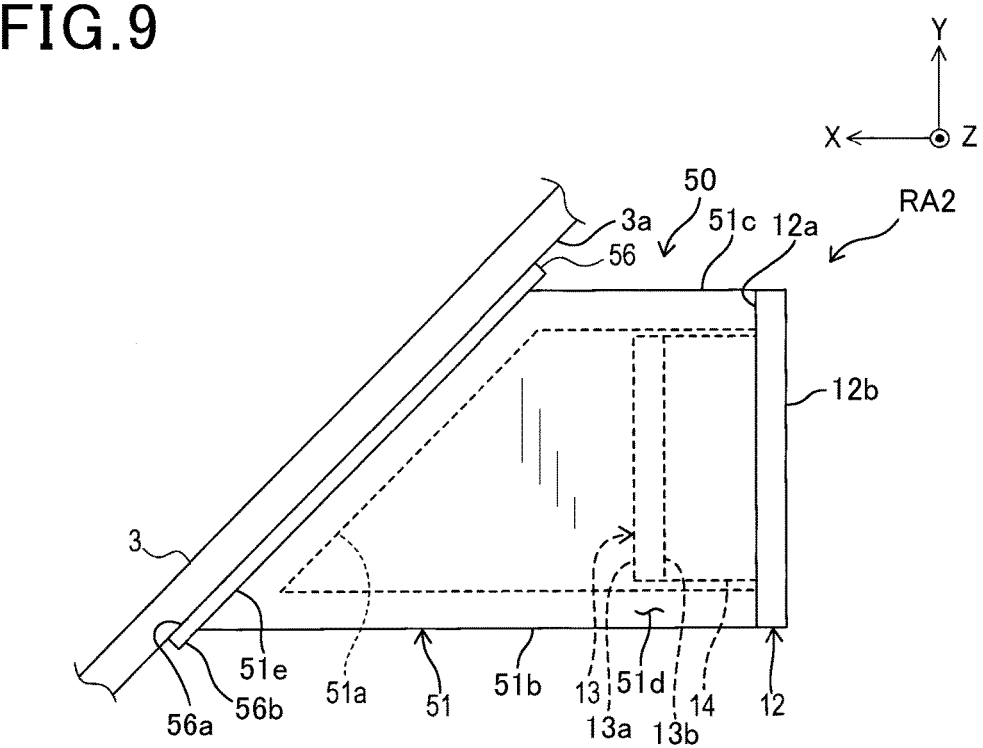
FIG. 9 is a side view of a radar assembly according to the third embodiment.

The following describes a radar assembly RA2 according to the third embodiment of the present disclosure with reference to FIG. 9.

The structure and functions of the radar assembly RA2 according to the third embodiment are slightly different from those of the radar assembly according to the first embodiment by the following points. So, the following describes mainly the different points.

The radar assembly RA2 according to the third embodiment includes a radar device 50, a frequency-selective substrate 56, and the front windshield 3. Specifically, the radar device 50 according to the third embodiment is disposed behind the front windshield 3, i.e. in front of a rearview mirror of the vehicle 1.

The front windshield 3 has a substantially plate-like shape, and is supported by A-pillars of the body frame 41 of the vehicle 1 so as to be inclined at a predetermined acute angle with respect to the X-axis direction.

The radar device 50, which is mounted in back of the front windshield 3, includes a radome 51 and the housing 12 parting with each other. Specifically, the radome 51 has a substantially rectangular bottom wall 51b, a substantially rectangular bottom wall 51b continuously extending obliquely upward from a front edge of the bottom wall 51b, and a substantially rectangular top wall 51c continuously extending horizontally from a top edge of the front wall 51a while facing the bottom wall 51a. The radome 51 also has a pair of substantially trapezoidal walls 51d, one of which continuously connects between a right edge of the bottom wall 51b and a right edge of the top wall 51c, and the other of which continuously connects between a left edge of the bottom wall 51b and a left edge of the top wall 51c.

That is, the above radome 51 has an inner hollow space. The front wall 51a is inclined at an acute angle with respect to the X-axis direction; the acute angle of the front wall 51a is substantially identical to the acute angle of the front windshield 3.

The housing 12 has a substantially rectangular plate-like shape, and has the opposing first and second major sides 12a and 12b. The rear ends of the top, bottom, and side walls 51b, 51c, and 51d of the radome 51 are mounted on the peripheral portion of the first major side 12a of the housing 12 to form a housing chamber in the radome 51 and housing 12. At least the front wall 51a of the radome 51 is configured as a transmissive portion 51a through which radar waves transmitted from the radar device 50 and echoes to be received by the radar device 50 is able to pass.

At least the transmissive portion 51a is made of a resin material. Specifically, the transmissive portion 51a is comprised of a dielectric material having a predetermined permittivity.

The radar device 50 includes the antenna module 13 and the radar module 14 housed in the housing chamber like the radar device 10. The antenna-formed surface 13a of the antenna module 13, which is substantially perpendicular to the X-axis direction, in other words, substantially parallel to the Y-Z plane.

The back surface 3a of the front windshield 3 is unparallel to the antenna-formed surface 13a of the antenna module 13, because, as described above, the front windshield 3 is inclined at the acute angle with respect to the X-axis direction.

In contrast, the front wall 51a, i.e. the transmissive portion 51a, of the radome 51 is inclined with respect to the X-axis direction so as to be substantially parallel to the back surface 3a of the front windshield 3.

The radar assembly RA2 also includes a plate-like frequency-selective substrate 56 having opposing first and second major surfaces 56a and 56b. The frequency-selective substrate 56 is comprised of the plurality of frequency-selective elements 20 like the frequency-selective substrate 6.

The frequency-selective substrate 56 is closely mounted at its first major surface 56a on a predetermined region of the back surface 3a of the front windshield 3. The radar device 50 is mounted to the frequency-selective substrate 56 such that an outer surface 51e of the transmissive portion 51a of the radome 51 is closely mounted on the second major surface 56b of the frequency-selective substrate 56 while the center of the outer surface 51e aligns with the center of the second major surface 56b. In other words, the outer surface 51e of the transmissive portion 51a of the radome 51 is closely mounted to the back surface 3a of the front windshield 3 via the frequency-selective substrate 56 while the center of the outer surface 51e aligns with the center of the second major surface 56b. The predetermined region of the back surface 3a of the front windshield 3 is defined as a projected region of the back surface 3a onto which the antenna-formed surface 13a is projected toward the X-axial forward direction. That is, the frequency-selective substrate 56 covers at least the whole of the projected region of the antenna-formed surface 13a.

That is, the radar assembly RA2 comprised of the front windshield 3, the frequency-selective substrate 56, and the radome 51 of the radar device 50 includes a sandwich structure, i.e. a three-layered structure. The sandwich structure is configured such that a first dielectric member, i.e. the front windshield 3, and a second dielectric member, i.e. the transmissive portion 51a, sandwich the frequency-selective substrate 56 from both the major sides 56a and 56b.

For example, the relationship between the permittivity of the front windshield 3 and the permittivity of the transmissive portion 51a of the radome 51 can be set to be identical to the relationship between the permittivity of the bumper cover 2 and the permittivity of the transmissive portion 11a of the radome 11. The relationship between the thicknesses of the front windshield 3, the frequency-selective substrate 56, and the transmissive portion 51a of the radome 51 can be set to be, for example, similar to the relationship between the thicknesses of the bumper cover 2, the frequency-selective substrate 6, and the transmissive portion 11a of the radome 11.

Radar waves transmitted from the antenna module 13 of the radar apparatus 50 pass through the sandwich structure of the radar module RA2 so as to be emitted outwardly from the vehicle 1. Arrival echoes based on reflection of the transmitted waves from something pass through the sandwich structure of the radar module RA2 so as to be received by the antenna module 13.

Note that the radar device 50 can be fixed to the vehicle 1 with one of various fixture methods. For example, the radar device 50 can be fixed to the roof of the vehicle cabin with stays, or fixed to a support supporting the rearview mirror.

The sandwich structure of the radar assembly RA2 according to the third embodiment enables reflection of radar waves, which are transmitted from the radar device 50, from the front windshield 3 of the vehicle 1 to be efficiently reduced. The sandwich structure of the radar assembly RA2 according to the third embodiment also enables reflection of the transmitted radar waves from the transmissive portion 51a to be efficiently reduced. This improves the transmissivity of the transmitted radar waves through the front windshield 3 of the vehicle 1 to the outside of the vehicle 1 like the first embodiment.

Fourth Embodiment

Figure 10:
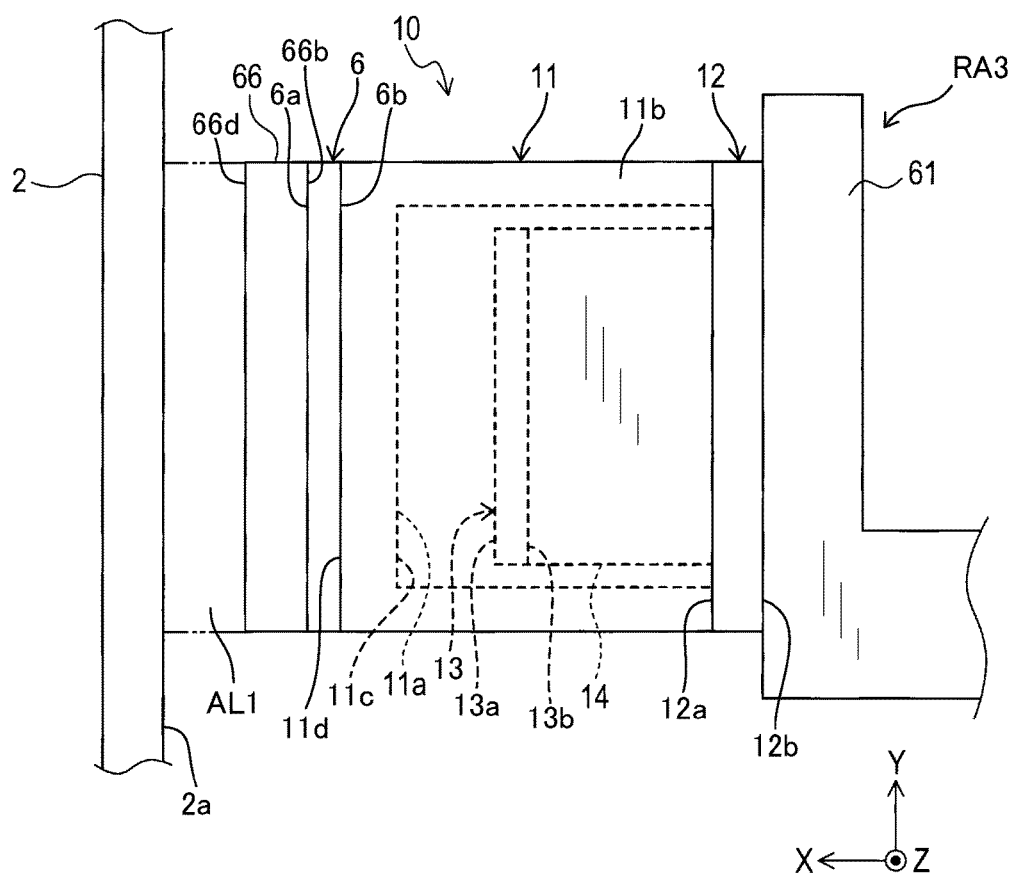
FIG. 10 is a side view of a radar assembly according to the fourth embodiment.

The following describes a radar assembly RA3 according to the fourth embodiment of the present disclosure with reference to FIG. 10.

The structure and functions of the radar assembly RA3 according to the fourth embodiment are mainly different from those of the radar assembly RA according to the first embodiment following first to third different points.

The first different point is that the housing 12 of the radar device 10 is mounted to a body frame 61 of the vehicle 1; the body frame 61 constitutes the chassis of the vehicle 1. For example, the housing 12 of the radar device 10 is fixedly mounted at its second major side 12b on the body frame 61 of the vehicle 1.

The second different point is that a plate-like seal member 66, which has opposing first and second major surfaces 66a and 66b, is closely mounted at its second major surface 66b on the first major surface 6a of the frequency-selective substrate 6. That is, the seal member 66 is adhered at its second major surface 66b to the first major surface 6a of the frequency-selective substrate 6. The first major surface 66a of the seal member 66 faces the back surface 2a of the bumper cover 2 with space, i.e. an air layer, AL1 between the first major surface 66a and the back surface 2a The radar apparatus 10 is fixedly mounted at its housing 12 to the body frame 61 of the vehicle 1 while the first major surface 66a of the seal member 66 faces the back surface 2a of the bumper cover 2 with the space between the first major surface 66a and the back surface 2a. For this reason, the shortest distance between the center of the outer surface 11d of the transmissive portion 11a of the radome 11 and the back surface 2a of the bumper cover 2 according to the fourth embodiment is longer than the shortest distance between the center of the outer surface 11d of the transmissive portion 11a of the radome 11 and the back surface 2a of the bumper cover 2 according to the first embodiment.

Like the first embodiment, the frequency-selective substrate 6 according to the fourth embodiment is arranged such that (1) The first major surface 6a is physically abutted onto the second major surface 66b of the seal member 66

(2) The second major surface 6b is physically abutted onto the outer surface 11d of the radome 11 like the first embodiment.

The seal member 66, which is made of an adhesive resin material, in other words, an adhesive dielectric material with a predetermined permittivity.

For example, the relationship between the permittivity of the seal member 66 and the permittivity of the transmissive portion 11a of the radome 11 can be set to be identical to the relationship between the permittivity of the bumper cover 2 and the permittivity of the transmissive portion 11a of the radome 11. The relationship between the thicknesses of the seal member 66, the frequency-selective substrate 6, and the transmissive portion 11a of the radome 11 can be set to be, for example, similar to the relationship between the thicknesses of the bumper cover 2, the frequency-selective substrate 6, and the transmissive portion 11a of the radome 11.

The radar assembly RA3 according to the fourth embodiment is configured such that the radar apparatus 10 is fixedly mounted to the body frame 61 of the vehicle 10. This results in a long distance between the outer surface 1d of the transmissive portion 11a of the radome 11 and the back surface 2a of the bumper cover 2. This makes it difficult for the back surface 2a of the bumper cover 2 and the outer surface 11d of the radome 11 to directly sandwich the frequency-selective substrate 6. In order to reduce reflection of transmitted radar waves from the bumper cover 2 to improve the transmissivity of the transmitted radar waves through the bumper cover 2, it is necessary to provide a sandwich structure where first and second dielectric members sandwich the frequency-selective substrate 6 from both the first and second major surfaces 6a and 6b like the first embodiment.

Accordingly, the assembly of the seal member 66, the frequency-selective substrate 6, and the transmissive portion 11a of the radome 11 includes a sandwich structure, i.e. a three-layered structure. The sandwich structure is configured such that a first dielectric member, which is comprised of the bumper cover 2, the air layer AL1, and the seal member 66, and a second dielectric member, i.e. the seal member 66, sandwich the frequency-selective substrate 6 from both the major sides 6a and 6b. The seal member 66 is arranged such that the first major surface 66a faces the back surface 2a of the bumper cover 2 with the space, i.e. the air layer AL1, between the seal member 66 and the back surface of the bumper cover 2. The air layer AL1 serves as a dielectric member with the predetermined permittivity.

The sandwich structure of the radar assembly RA3 according to the fourth embodiment enables reflection of radar waves, which are transmitted from the radar device 10, from the seal member 66 to be efficiently reduced. The sandwich structure of the radar assembly RA3 according to the fourth embodiment also enables reflection of the transmitted radar waves from the transmissive portion 11a to be efficiently reduced. This results in efficient reduction of reflection of the transmitted radar waves from the bumper cover 2. This improves the transmissivity of the transmitted radar waves through the bumper cover 2 of the vehicle 1 to the outside of the vehicle 1 like the first embodiment.

Note that the frequency-selective substrate 6 and the seal member 66 can be independently prepared. The conductor pattern of the frequency-selective substrate 6 can also be formed on the second major surface 66b of the seal member 66 using, for example, etching like the first embodiment, and thereafter, the frequency-selective substrate 6 can be adhered at its first major surface 6a to the second major surface 66b of the seal member 66.

Next, the following describes typical modifications of the embodiment of the present disclosure. In the descriptions of the typical modifications, redundant descriptions of like parts between the embodiments and each modification, to which like referenced characters are assigned, are omitted or simplified. The following typical modifications are some of the considerable modifications of each embodiment, and therefore, the following typical modifications do not limit the scope of the present disclosure.

When the radar device 10 is fixed to the body frame 61 of the vehicle 1, the radar device 10 is disposed behind the bumper cover 2 with the use of the seal member 66 with space between the back surface 2a of the bumper cover 2 and the first major surface 66a of the seal member 66 as described in the fourth embodiment. The radar device 10 according to the present disclosure can be disposed behind the bumper cover 2 as illustrated in FIG. 11A.

Specifically, a radar device 70 has a structure identical to the structure of the radar device 10 except for the structure of a radome 71. The radome 71 has a substantially rectangular base wall 71a and a substantially rectangular tubular sidewall 71b having a first peripheral edge surrounding the base wall 71a, which is basically identical in structure to the radome 11. One different point of the radome 71 from the radome 11 is that the X-axial length of the tubular sidewall 71b of the radome 71 is longer than the X-axial length of the tubular sidewall 11b of the radome 11, so that an outer surface 71d of the base wall 71a, i.e. the transmissive portion 71a, is directly abutted onto the second major surface 6b of the frequency-selective substrate 6. In addition, the frequency-selective substrate 6 is adhered at its first major surface 6a to the back surface 2a of the bumper cover 2.

Figure 11A:
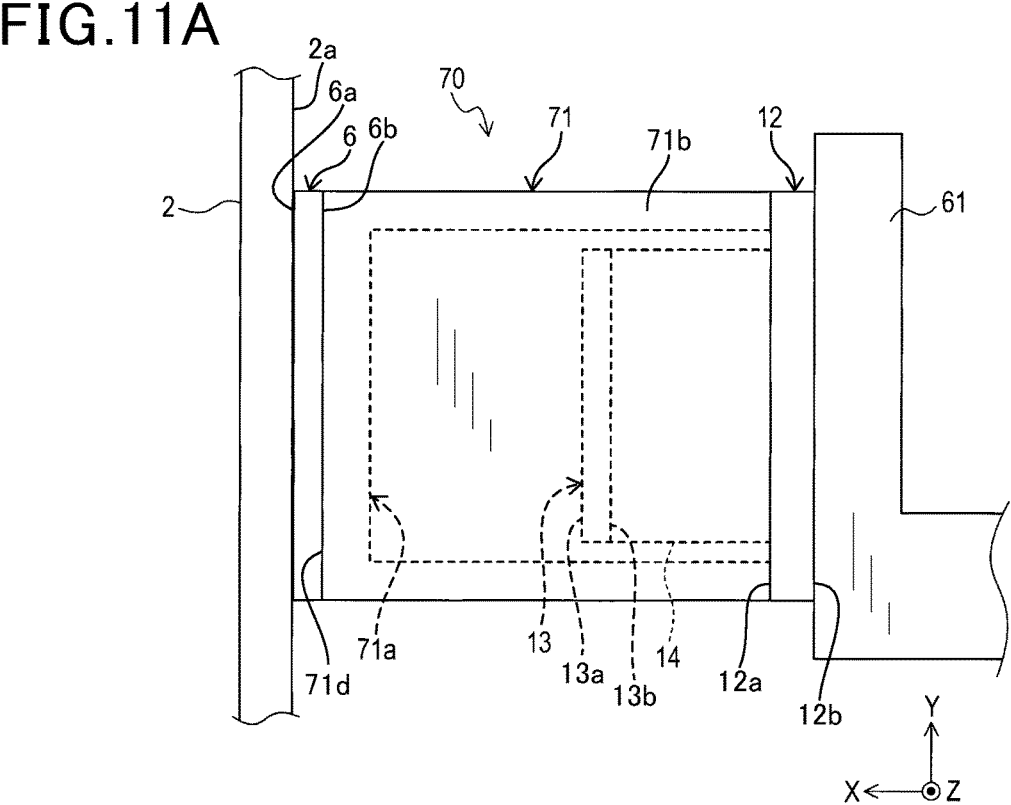
FIG. 11A is a side view of a radar assembly according to a modification of the first embodiment.

This configuration of the radar assembly illustrated in FIG. 11A enables a first dielectric member, i.e. the bumper cover 2, and a second dielectric member, i.e. the transmissive portion 71a, to sandwich the frequency-selective substrate 6 from both the major sides 6a and 6b without using another dielectric member like the seal member 66. That is, like the first embodiment, the radar assembly illustrated in FIG. 11 includes the sandwich structure, i.e. the three-layered structure, configured such that the bumper cover 2 and the transmissive portion 11a sandwich the frequency-selective substrate 6 from both the major sides 6a and 6b.

The sandwich structure of the radar assembly illustrated in FIG. 11 enables reflection of transmitted radar waves from the sandwich structure of the radar assembly to be efficiently reduced. This improves the transmissivity of the transmitted radar waves through the bumper cover 2 of the vehicle 1 to the outside of the vehicle 1 like the first embodiment.

Note that such a radar device with a radome having an extended longitudinal length in the X-axis direction as illustrated in FIG. 11 can also be mounted at the outer surface of the radome on the back surface of another outermost structural member, such as the front windshield 3 or the door panel 4, of the vehicle 1.

Figure 11B:
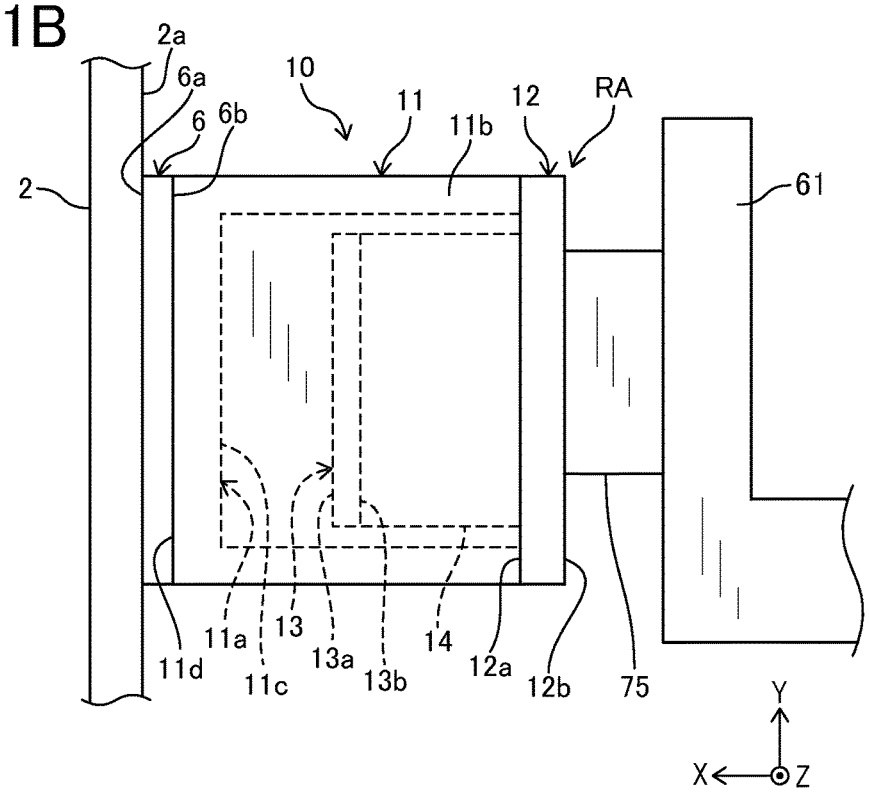
FIG. 11B is a side view of a radar assembly according to another modification of the first embodiment.

In addition, as illustrated in FIG. 11B, the radar assembly RA according to the first embodiment can be attached to the body frame 61 of the vehicle 1 with an attachment 75 such that the outer surface 11d of the transmissive portion 11a of the radome 11 is abutted onto the second major surface 6b of the frequency-selective substrate 6 with the first major surface 6a being adhered to the back surface 2a of the bumper cover 2. This also enables the sandwich structure to be established where the frequency-selective substrate 6 is sandwiched by the bumper cover 2 and the radome 11.

The radar assembly RA1 according to the second embodiment is configured such that the radar device 10 is disposed behind the door panel 4 while the radar device 10 is fixed to the body frame 41 of the vehicle 1. The radar assembly RA1 can be configured such that the radar device 10 is arranged behind the door panel 4 while the radar device 10 is fixed to the door panel 4.

Figure 12A:
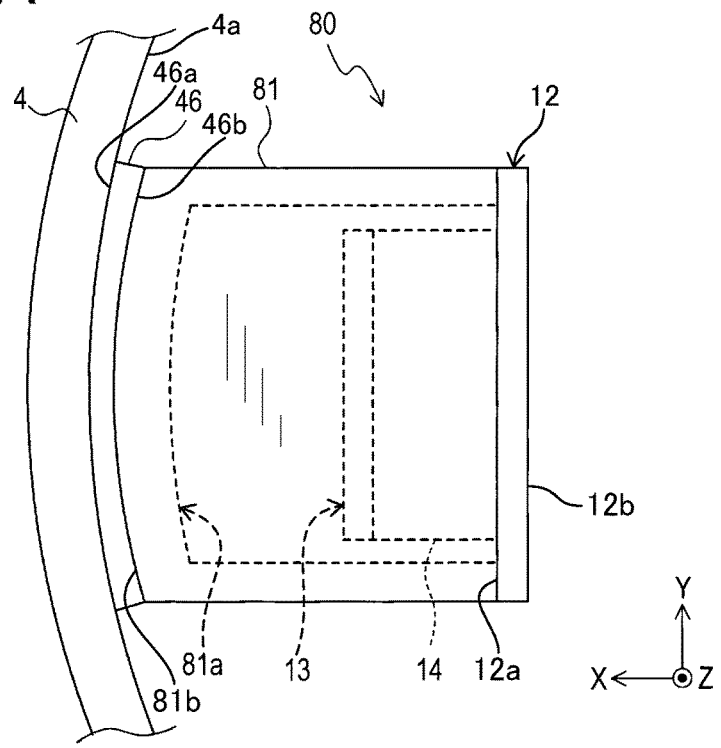
FIG. 12A is a side view of a radar assembly according to a modification of the second embodiment.

For example, as illustrated in FIG. 12A, a radome 81 of a radar device 80 has a structural different point from the radome 11 of the radar device 10 in that at least an outer surface 81d of a base wall, i.e. transmissive portion, 81a of the radome 81 has a predetermined curvature so as to have an outwardly convex shape in the longitudinal direction of the vehicle 1. The outwardly convex shape of the outer surface 81d of the transmissive portion 81a is identical to the outwardly convex shape of each of the door panel 4 and the frequency-selective substrate 46. As an example, as illustrated in FIG. 12A, the whole of the transmissive portion 81a of the radome 81 has a predetermined curvature so as to have an outwardly convex shape in the longitudinal direction of the vehicle 1.

The radome 81 of the radar device 80 is arranged such that the outer surface 81d of the radome 81 is physically abutted onto the second major surface 46b of the frequency-selective substrate 46 with the first major surface 46a being adhered to the back surface 4a of the door panel 4. This enables the sandwich structure to be established where the frequency-selective substrate 46 is sandwiched by the door panel 4 and the radome 11.

Figure 12B:
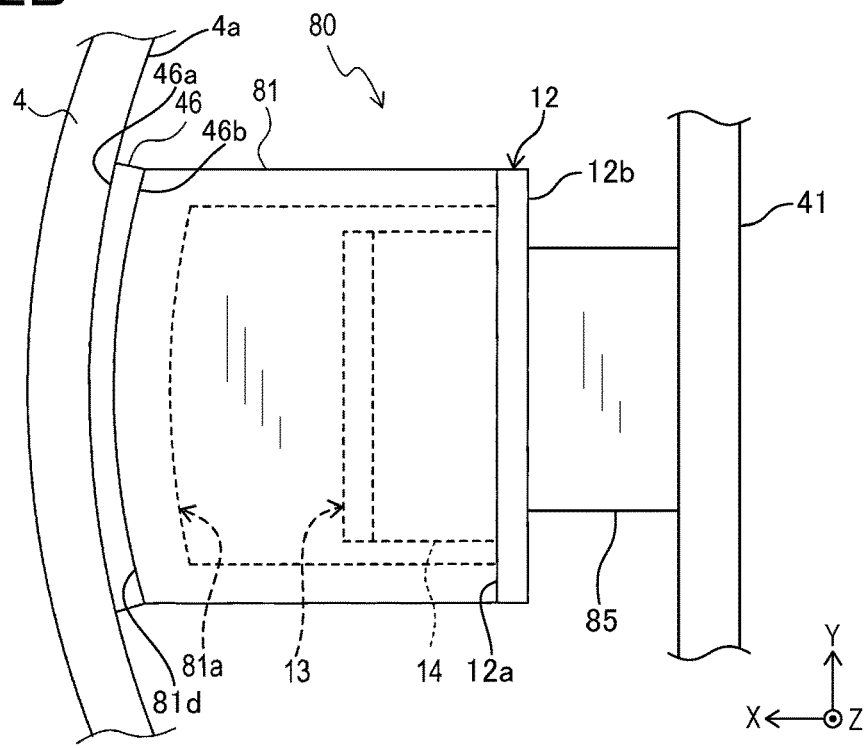
FIG. 12B is a side view of a radar assembly according to another modification of the second embodiment.

As illustrated in FIG. 12B, the radar assembly illustrated in FIG. 12A can be attached to the body frame 41 of the vehicle 1 with an attachment 85 such that the outer surface 81d of the transmissive portion 81a of the radome 81 is abutted onto the second major surface 46b of the frequency-selective substrate 46 with the first major surface 46a being adhered to the back surface 4a of the door panel 41. This also enables the sandwich structure to be established where the frequency-selective substrate 46 is sandwiched by the door panel 4 and the radome 81.

The radar device 10 according to the first embodiment can be disposed behind the front windshield 3.

Figure 13:
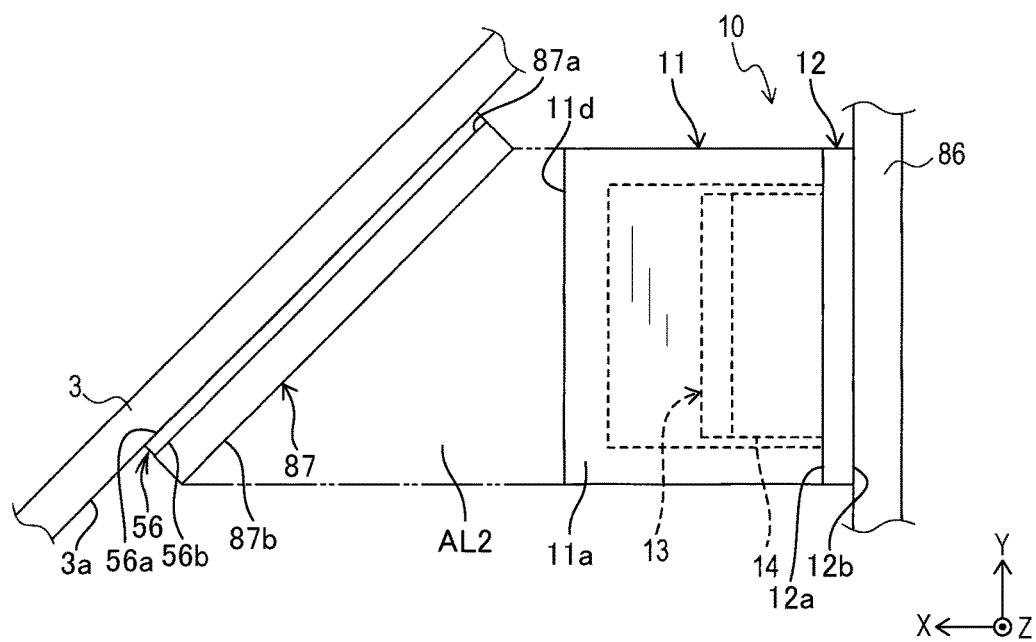
FIG. 13 is a side view of a radar assembly according to a modification of the third embodiment.

Specifically, as illustrated in FIG. 13, a frequency-selective substrate 56, which has opposing first major surface 56a and second major surface 56b, is closely mounted at its first major surface 56a on the back surface 4a of the door panel 4. The frequency-selective substrate 56 is comprised of the plurality of frequency-selective elements 20 like the frequency-selective substrate 6.

A plate-like seal member 87, which has opposing first and second major surfaces 87a and 87b, is closely mounted at its first major side 87a on the second major surface 56b of the frequency-selective substrate 56. The housing 12 of the radar device 10 is mounted to, for example, a support 86 for supporting the rearview mirror in the cabin of the vehicle 1.

The outer surface 11d of the transmissive portion 11a of the radome 11 faces the second major side 87b of the seal member 87 with space, i.e. air layer, AL2 between the second major side 87b and the outer surface 11d of the transmissive portion 11a while the center of the outer surface 11d aligns with the center of the second major surface 87b. In other words, the outer surface 11d of the radome 11 is located at a predetermined distance from the second major side 87b of the seal member 87 while the center of the outer surface 11d aligns with the center of the second major surface 87b.

The assembly of the front windshield 3, the frequency-selective substrate 56, and the seal member 87 includes a sandwich structure, i.e. a three-layer structure. The sandwich structure is configured such that a first dielectric member, i.e. the front windshield 3, and a second dielectric member, which is comprised of the seal member 87, the air layer AL2, and the transmissive portion 11a, sandwich the frequency-selective substrate 56 from both the major sides 56a and 56b. The radar device 10 is arranged such that the outer surface 11d of the transmissive portion 11a faces the second major surface 87b of the seal member 87 with the space, i.e. air layer AL2 between the second major surface 87b and the outer surface 11d. The air layer AL2 serves as a dielectric member with the predetermined permittivity.

The sandwich structure of the radar assembly illustrated in FIG. 13 enables reflection of radar waves, which are transmitted from the radar device 10, from the front windshield 3 of the vehicle 1 to be efficiently reduced. The sandwich structure of the radar assembly illustrated in FIG. 13 also enables reflection of the transmitted radar waves from the seal member 87 to be efficiently reduced. This improves the transmissivity of the transmitted radar waves through the front windshield 3 of the vehicle 1 to the outside of the vehicle 1 like the first embodiment.

Figure 14:
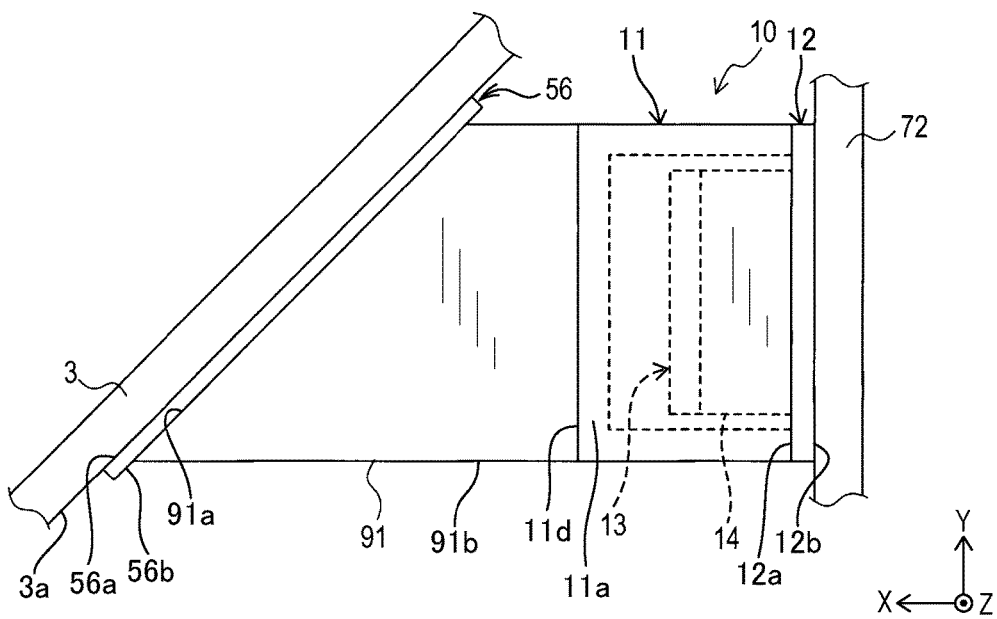
FIG. 14 is a side view of a radar assembly according to another modification of the third embodiment.

As a modification of the radar assembly illustrated in FIG. 13, a radar assembly illustrated in FIG. 14 is configured such that the seal member 87 is eliminated from the radar assembly illustrated in FIG. 13, and a trapezoidal columnar dielectric member 91 is interposed between the second major surface 56b of the frequency-selective substrate 56 and the outer surface 11d of the transmissive portion 11a of the radome 11. A front inclined surface 91a of the dielectric member 91 is adhered to the second major surface 56b of the frequency-selective substrate 56, and a rear vertical surface 91b, which is opposite to the front inclined surface 91a, is adhered to the outer surface 11d of the transmissive portion 11a of the radome 11. That is, the frequency-selective substrate 56 is indirectly in contact with the radome 11 via the dielectric member 91.

The structure of the radar assembly illustrated in FIG. 14 in which the dielectric member 91 is interposed between the frequency-selective substrate 56 and the radome 11 of the radar device 10 can be applied to the radar assembly RA1 illustrated in FIG. 8.

The subject matter of the present disclosure is that a first dielectric member and a second dielectric member sandwich a frequency-selective substrate from both its major surfaces to constitute a sandwich structure, and a radar device is arranged such that radar waves transmitted from the radar device pass through the sandwich structure, i.e. the three-layered structure.

Within the scope of the subject matter of the present disclosure, the aforementioned three-layered structure and/or the aforementioned relative positional relationships between each three-layered structure and the antenna module 13 can be freely modified.

Figure 15A:
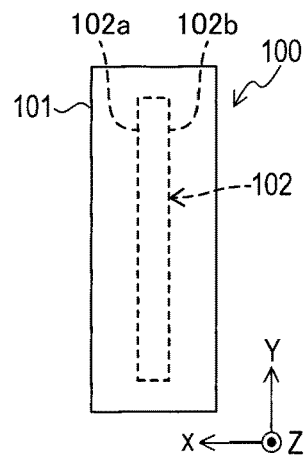
FIG. 15A is a side view of a dielectric structure according to a modification of a three-layer structure according to each of the first to fourth embodiments.
Figure 15B:
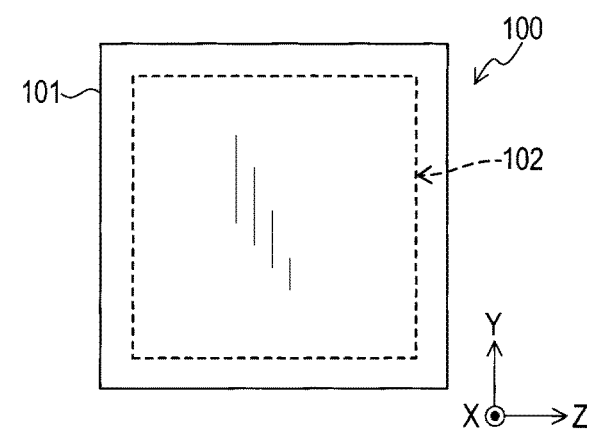
FIG. 15B is a major side view of the dielectric structure illustrated in FIG. 15A.

For example, as illustrated in FIGS. 15A and 15B, a dielectric structure 100 with an embedded frequency-selective substrate 102 is prepared. Specifically, the dielectric structure 100 includes a plate-like dielectric member 101 comprised of a dielectric material having a predetermined permittivity. The dielectric structure 100 also includes a frequency-selective substrate 102, which has opposing first and second major surfaces 102a and 102b, embedded in the dielectric member 101 such that the dielectric member 101 covers the frequency-selective substrate 102. The dielectric structure 100 can be interposed between an outermost structural member of the vehicle 1, such as the bumper cover 2, and the radome 11. For example, the frequency-selective substrate 6 can be replaced with the dielectric structure 100.

That is, in view of the frequency-selective substrate 102, the frequency-selective substrate 102 are sandwiched between a first dielectric portion DP1 and a second dielectric portion DP2 of the dielectric member 101; the first dielectric portion DP1 is abutted onto the first major surface 102a and the second dielectric portion DP2 is abutted onto the second major surface 102b. This results in the dielectric member 101 inherently having a three-layered structure, i.e. a sandwich structure.

Figure 15C:
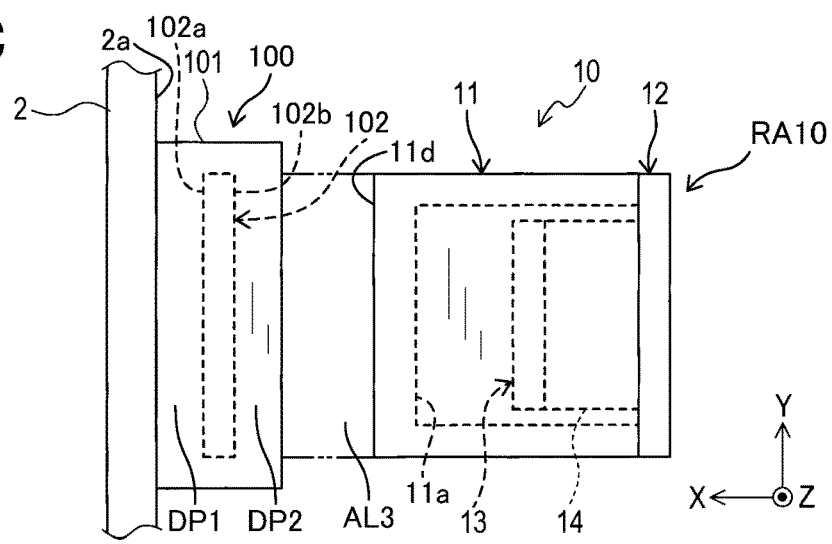
FIG. 15C is a side view of a radar assembly including the dielectric structure illustrated in FIGS. 15A and 15B.

Thus, interposing the dielectric structure 100 between the back surface 2a of the bumper cover 2 and the outer surface 11d of the radome 11 of the radar device 10 with space, i.e. air layer AL3, between the dielectric structure 100 and the outer surface 11d constitutes a radar assembly RA10 (see FIG. 15C). The radar assembly RA10 includes a first dielectric member comprised of the bumper cover 2 and the first dielectric portion DP1 of the dielectric member 101. The radar assembly RA10 also includes a second dielectric member comprised of the dielectric portion DP2, the air layer AL3, and the transmissive portion 11a. The air layer AL3 serves as a dielectric member with the predetermined permittivity.

The radar assembly RA10 enables reflection of the transmitted radar waves from the bumper cover 2 and the dielectric structure 100 to be efficiently reduced, thus improving the transmissivity of the transmitted radar waves through the bumper cover 2 of the vehicle 1 to the outside of the vehicle 1 like the first embodiment.

Figure 15D:
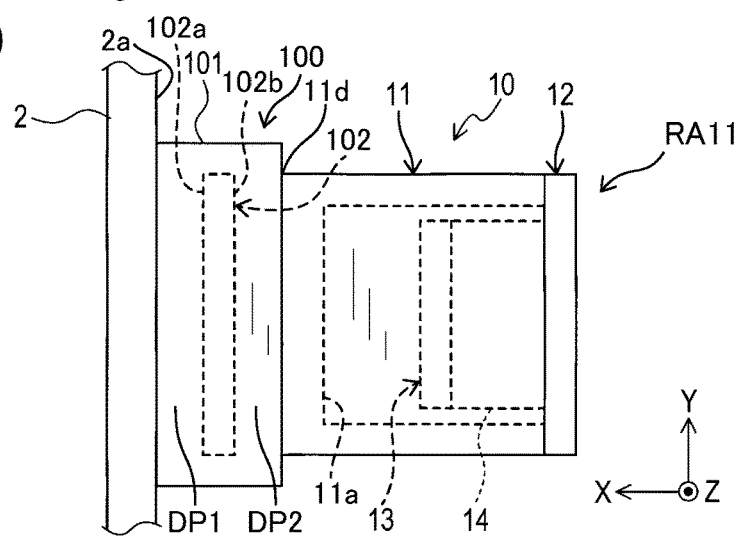
FIG. 15D is a side view of another radar assembly including the dielectric structure illustrated in FIGS. 15A and 15B.

Alternatively, interposing the dielectric structure 100 between the back surface 2a of the bumper cover 2 and the outer surface 11d of the radome 11 of the radar device 10 with the outer surface 11d being in contact with the dielectric structure 100 constitutes a radar assembly RA11 (see FIG. 15D). The radar assembly RA11 enables reflection of the transmitted radar waves from the bumper cover 2 and the dielectric structure 100 to be efficiently reduced, thus improving the transmissivity of the transmitted radar waves through the bumper cover 2 of the vehicle 1 to the outside of the vehicle 1 like the first embodiment.

The dielectric structure 100 can be abutted onto the outer surface 11d of the radome 11 with space between the back surface 2a of the bumper cover 2 and the dielectric structure 100 in the radar assembly RA10 illustrated in FIG. 15C.

As illustrated in FIGS. 8 and 10, if an outermost structural member of the vehicle 1, such as the bumper cover 2 or the front windshield 3, has a predetermined curvature, and a frequency-selective substrate is adhered at its one major surface to the back surface of the outermost structural member, at least the major surface of the frequency-selective substrate can be formed to have the same curvature. Then, the frequency-selective substrate can be adhered at the curved major surface to the back surface of the outermost structural member.

The three-layered structure in which an outermost structural member of a vehicle is abutted onto a first major surface of a frequency-selective substrate with its second major surface being abutted onto another dielectric member, such as a seal member, as illustrated in FIG. 8 can be applied to one of various outermost structural members of the vehicle.

In each of the above embodiments and their modifications, the corresponding radar device can be fixed to a selected one of the chassis of the vehicle and another structural member of the vehicle, such as an outermost structural member. That is, how the radar device is fixed to the vehicle can be freely determined as long as the radar device faces an outermost structural member of the vehicle.

Each of the frequency-selective elements 20 constituting the frequency-selective substrate has a square-looped frequency-selective conductor pattern illustrated in FIG. 4 as an example. Specifically, each of the frequency-selective elements 20 can have one of various patterns as long as each frequency-selective element 20 serves as a bandpass filter to pass radar waves transmitted from radar device within a specified frequency band therethrough, and blocks radar waves outside the specified frequency band.

Figure 16A:
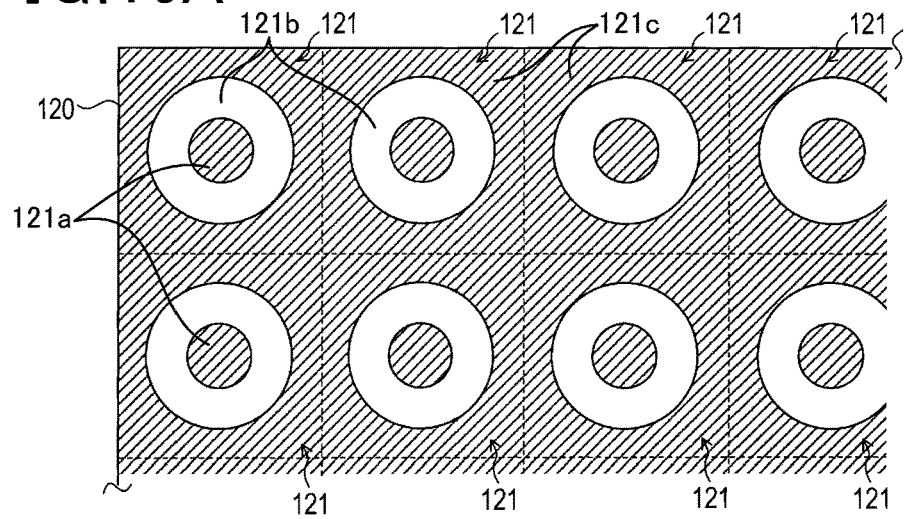
FIG. 16A is a major side view of a modified frequency-selective substrate according to each of the first to fourth embodiments.

For example, referring to FIG. 16A, each frequency-selective element 121, which has, for example, a substantially square shape, of a frequency-selective substrate 120 has a circular-looped frequency-selective conductor pattern for generating a resonance with radar waves within the specified frequency band. Specifically, each frequency-selective element 121 includes a circular inner conductor 121a, a circular inner slot 121b surrounding the circular inner conductor 121a, and an outer conductor 121c surrounding the circular inner slot 121b.

The sizes of the respective elements 121a, 121b, and 121c of each frequency-selective element 121 are freely determined within the intended use of the frequency-selective substrate 120. The intended use of the frequency-selective substrate 120 is to reduce in-vehicle reflection of radar waves transmitted from the antenna module of a radar device towards the antenna module instead of being emitted outwardly from the vehicle 1.

Figure 16B:
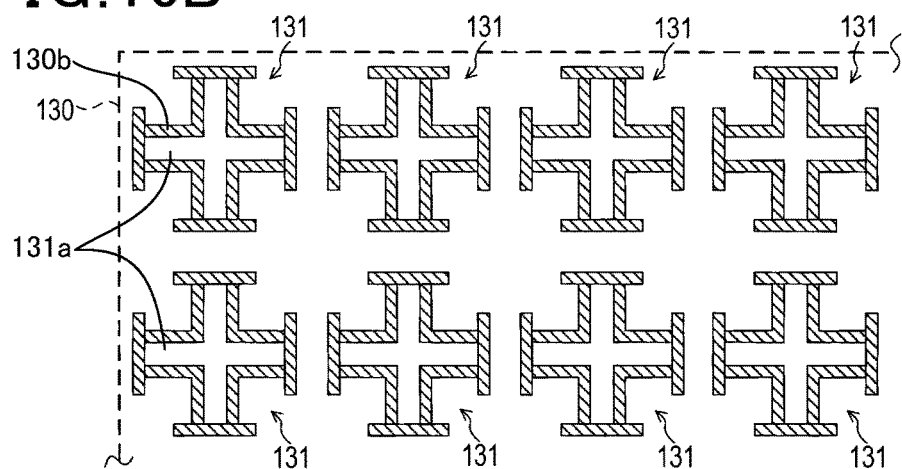
FIG. 16B is a major side view of another modified frequency-selective substrate according to each of the first to fourth embodiments.

As another example, referring to FIG. 16B, each frequency-selective element 131, which has, for example, a substantially cross shape, of a frequency-selective substrate 130 has a cross-looped frequency-selective conductor pattern for generating a resonance with radar waves within the specified frequency band. Specifically, each frequency-selective element 131 includes a cross inner slot 131a, and a cross-shaped outer conductor 131b, which is hatched in FIG. 16B, surrounding the cross inner slot 131a.

The sizes of the respective elements 131a and 131b of each frequency-selective element 131 are freely determined within the intended use of the frequency-selective substrate 130. The intended use of the frequency-selective substrate 130 is to reduce in-vehicle reflection of radar waves transmitted from the antenna module of a radar device towards the antenna module instead of being emitted outwardly from the vehicle 1.

Figure 16C:
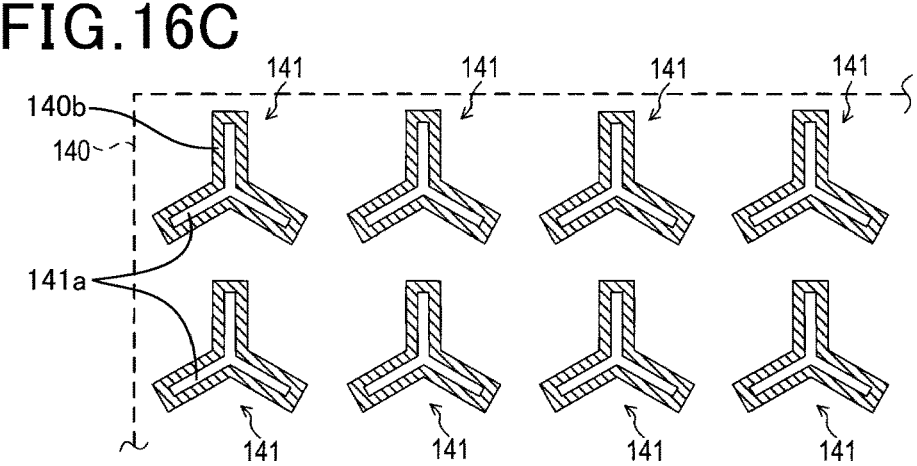
FIG. 16C is a major side view of a further modified frequency-selective substrate according to each of the first to fourth embodiments.

As a further example, referring to FIG. 16C, each frequency-selective element 141, which has, for example, a substantially triangular shape, of a frequency-selective substrate 140, has a triangular-looped frequency-selective conductor pattern for generating a resonance with radar waves within the specified frequency band. Specifically, each frequency-selective element 141 includes a triangular inner slot 141a, and a triangular-shaped outer conductor 141b, which is hatched in FIG. 16C, surrounding the triangular inner slot 141a.

The sizes of the respective elements 141a and 141b of each frequency-selective element 141 are freely determined according to the intended use of the frequency-selective substrate 140. The intended use of the frequency-selective substrate 140 is to reduce in-vehicle reflection of radar waves transmitted from the antenna module of a radar device towards the antenna module instead of being emitted outwardly from the vehicle 1.

In particular, the frequency-selective element 121 of the frequency-selective substrate 120 including the circular-looped slot 121b can serves as a bandpass filter for transmitted radar waves having any polarized surfaces.

A three-layer structure, i.e. a sandwich structure, of a first dielectric member, a frequency-selective substrate, and a second dielectric member according to each of the embodiments and their modifications can be configured such that a part of at least one major surface of the frequency-selective substrate is not abutted onto a corresponding one of the first and second dielectric members. For example, at least one of the first and second dielectric members can have a surface formed with bumps and dents; the surface faces the frequency-selective substrate. As another example, at least one of the first and second dielectric members can have formed holes therethrough. As a further example, at least one of the first and second dielectric members can have a surface formed with waved portions; the surface faces the frequency-selective substrate.

That is, each of the first and second dielectric members, which is abutted onto the frequency-selective substrate, can have a selected one of various shapes as long as at least part of the corresponding dielectric member is abutted onto the frequency-selective substrate according to each of the embodiments and their modifications. Similarly, each of the first and second dielectric members can have a selected one of various shaped surfaces, which is abutted onto the frequency-selective substrate, as long as at least part of the selected shaped surface is abutted onto the frequency-selective substrate according to each of the embodiments and their modifications.

The direction to which radar waves are transmitted from a radar device according to the present disclosure can be freely determined depending on the intended use of the radar device. Each of the aforementioned embodiments shows that the antenna-formed surface 13a of the antenna module 13 is disposed to be substantially perpendicular to the longitudinal direction of the vehicle 1, i.e. parallel to the vehicle width direction. The antenna-formed surface 13a of the antenna module 13 can be disposed to be non-perpendicular to the longitudinal direction of the vehicle 1, i.e. unparallel to the vehicle width direction. In each of the embodiments and their modifications, the antenna-formed surface 13a of the antenna module 13 is not limited to be substantially parallel to the outer surface of the radome. The back surface of an outermost structural member, such as the bumper cover 2 or the front windshield 3, is not limited to be substantially parallel to the antenna-formed surface 13a of the antenna module 13.

The subject matters disclosed in the present disclosure can be applied to various radar assemblies each including an outermost structural member of a vehicle and a radar device arranged behind the back surface of the outermost structural member. In the various radar assemblies to which the present disclosure can be applied, the type and/or shape of an outermost structural member are not limited, and the size and/or shape of the radome are not limited.

The bumper cover 2, the front windshield 3, and the door panel 4 according to the corresponding embodiments are examples of outermost structural members of the vehicle 1. Specifically, the subject matters disclosed in the present disclosure can be applied to (1) An example where a radar device is disposed behind the back surface of another body component of a vehicle, such as an outer panel, except for the door panel 4

(2) An example where a radar device is disposed behind the back surface of another windshield, such as the rear windshield or the left or right door glass panel, except for the front windshield (3) An example where a radar device is disposed behind the back surface of a rear bumper cover.

That is, the scope of the present disclosure can include various structures of radar assemblies as long as (1) A frequency-selective substrate is disposed in a passage between a radome of a radar device and the back surface of an outermost structural member of a vehicle; radar waves are transmitted from the radar device through the passage (2) The frequency-selective substrate is sandwiched between a first dielectric member, which is the outermost structural member itself or another dielectric member, and a second dielectric member, which is at least part of the radome itself or another dielectric member, so as to constitute a three-layered structure, i.e. a sandwich structure.

The thickness and the electrical characteristics of an outermost structural member, such as the bumper cover 2, the front windshield 3, or the door panel 4, of each radar assembly according to the present disclosure can be freely determined as long as the corresponding radar assembly enables reflection of radar waves from the outermost structural member to be reduced.

The size and dimensions of a frequency-selective substrate, in particular, the size and dimensions of each frequency-selective element of each radar assembly according to the present disclosure can be freely determined as long as the corresponding radar assembly enables reflection of radar waves from the outermost structural member to be reduced.

The size and electrical characteristics of each dielectric member, when the dielectric member is abutted onto a surface of a frequency-selective substrate of each radar assembly according to the present disclosure can be freely determined as long as the corresponding radar assembly enables reflection of radar waves from the outermost structural member to be reduced.

The frequency band of radar waves transmitted from a radar device according to the present disclosure freely determined.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A radar assembly of a vehicle comprising:
a first dielectric member having a back surface and including a dielectric outermost structural member of the vehicle;
a radar device comprising:
an antenna module configured to transmit a radar wave within a predetermined frequency band and to receive an echo based on the transmitted radar wave;
a substantially tubular or domed radome comprising a transmissive portion and disposed to cover at least the antenna module such that the transmitted radar wave passes through the transmissive portion so as to be emitted outwardly from the radar device,
the transmissive portion being disposed behind the back surface of the first dielectric member with space between the transmissive portion and the back surface of the first dielectric member;
a second dielectric member comprised of at least the transmissive portion and disposed to face the first dielectric member; and
a frequency-selective substrate having opposing first and second surfaces and configured to pass the radar wave within the predetermined frequency band therethrough, and block radar waves outside the predetermined frequency band,
the frequency-selective substrate being disposed such that the first surface is directly abutted onto the first dielectric member and the second surface is directly abutted onto the second dielectric member to constitute a sandwich structure based on the first dielectric member, the frequency-selective substrate, and the second dielectric member.

2. The radar assembly according to claim 1, wherein:
the first dielectric member consists of the outermost structural member, and the frequency-selective substrate is disposed such that the first surface is directly abutted onto the outermost structural member.

3. The radar assembly according to claim 2, wherein:
the second dielectric member consists of the transmissive portion of the radome, and the frequency-selective substrate is disposed such that the second surface is directly abutted onto the transmissive portion of the radome.

4. The radar assembly according to claim 3, wherein:
the outermost structural member has a first thickness substantially perpendicular to the first surface of the frequency-selective substrate, and the transmissive portion has a second thickness perpendicular to the second surface of the frequency-selective substrate, the first thickness being substantially identical to the second thickness.

5. The radar assembly according to claim 2, wherein:
the second dielectric member includes a dielectric element in addition to the transmissive portion, and the frequency-selective substrate is disposed such that the second surface is directly abutted onto the dielectric element, and the dielectric element is disposed to face the transmissive portion with space between the dielectric element and the transmissive portion.

6. The radar assembly according to claim 1, wherein:
the second dielectric member consists of the transmissive portion of the radome, and the frequency-selective substrate is disposed such that the second surface is directly abutted onto the transmissive portion of the radome.

7. The radar assembly according to claim 1, wherein:
the first dielectric member includes a dielectric element in addition to the outermost structural member, and the frequency-selective substrate is disposed such that the first surface is directly abutted onto the dielectric element, and the dielectric element is disposed to face the outermost structural member with space between the dielectric member and the outermost structural member.

8. The radar assembly according to claim 1, wherein:
the second dielectric member includes a dielectric element in addition to the transmissive portion, and the frequency-selective substrate is disposed such that the second surface is directly abutted onto the dielectric element, and the dielectric element is disposed to face the transmissive portion with space between the dielectric element and the transmissive portion.

9. The radar assembly according to claim 1, wherein:
the outermost structural member is a bumper cover of the vehicle.

10. The radar assembly according to claim 1, wherein:
the outermost structural member is a glass panel of the vehicle.

11. The radar assembly according to claim 1, wherein:
the outermost structural member is a resin body component of the vehicle.

12. The radar assembly according to claim 1, wherein:
the frequency-selective substrate comprises at least one frequency-selective conductive element including a looped slot therein.

13. The radar assembly according to claim 12, wherein:
the at least one frequency-selective conductive element comprises a plurality of frequency-selective conductive elements arranged two-dimensionally.

14. The radar assembly according to claim 12, wherein:
the at least one frequency-selective conductive element includes a square-looped slot therein as the looped slot.

15. The radar assembly according to claim 12, wherein:
the at least one frequency-selective conductive element includes a circular-looped slot therein as the looped slot.

16. The radar assembly according to claim 1, wherein:
the radar device is fixed to a chassis of the vehicle, the chassis being different from the first outermost structural member.

* * * * *